United States Patent [19]

Gellos

[11] 4,136,560

[45] Jan. 30, 1979

[54] PRESSURE GAUGE

[76] Inventor: Alexander T. Gellos, 144-36 29th Ave., Flushing, N.Y. 11354

[21] Appl. No.: 859,015

[22] Filed: Dec. 9, 1977

Related U.S. Application Data

[63] Continuation-in-part of Ser. No. 754,514, Dec. 27, 1976, abandoned, which is a continuation-in-part of Ser. No. 591,899, Jun. 30, 1975, abandoned, which is a continuation-in-part of Ser. No. 464,239, Apr. 25, 1974, abandoned.

[51] Int. Cl.² .................... B60C 23/00; G01L 7/16
[52] U.S. Cl. .................................. 73/146.8; 73/744
[58] Field of Search ............ 73/146.8, 744, 406; 137/226, 227

[56] References Cited

U.S. PATENT DOCUMENTS

| | | | |
|---|---|---|---|
| 3,670,688 | 6/1972 | Seaberg | 73/146.8 |
| 3,719,198 | 3/1973 | Wilhelm et al. | 73/146.8 |
| 3,789,867 | 2/1974 | Yabor | 73/146.8 |
| 3,889,530 | 6/1975 | Bluem | 73/146.8 |

*Primary Examiner*—Donald O. Woodiel
*Attorney, Agent, or Firm*—Kenyon & Kenyon, Reilly, Carr & Chapin

[57] ABSTRACT

This invention describes a pressure gauge which is one embodiment is adapted to be continuously mounted on the valve stem of the inflated device, thereby providing a continuous indication of the pressure therein. It includes an airtight enclosure formed by an expandable means such as a diaphragm, positioned within an outer housing. The gauge is adapted to contact the standard valve stem in the inflated device to release pressurized gas from the device into the airtight enclosure. In response thereto, the airtight enclosure expands. Cooperating with this expansion of the airtight enclosure is a piston like member which includes means for controlling the expansion of the airtight enclosure. The control means is calibrated so that the piston like member moves an axial distance in an amount proportional to the pressure of the gas in the tube. The piston has an indicator band painted thereon which positions itself opposite appropriate psi markings on the outside of the housing. This provides a ready indication of the pressure. The means for releasing the pressure into the expandable, airtight enclosure, is further adapted to enable additional pressurized gas to be introduced into the inflated device.

The expansable enclosure is adapted to insure an airtight seal within the gauge if the diaphragm should rupture for any reason.

Other embodiments of the basic invention describe alternate approaches to providing the expandable airtight enclosure including expandable bellows, a hollow flexible tube or a scheme wherein the space between the piston member and the outer housing is sealed by suitably positioned O-rings.

Still other embodiments describe a passive gauge which must be depressed by the operator's thumb to function but which also provide means for supplying pressurized gas to the inflatable device while the gauge is in place. These embodiments provide a doubling back of the airtight enclosure reducing the overall height of the gauge.

35 Claims, 44 Drawing Figures

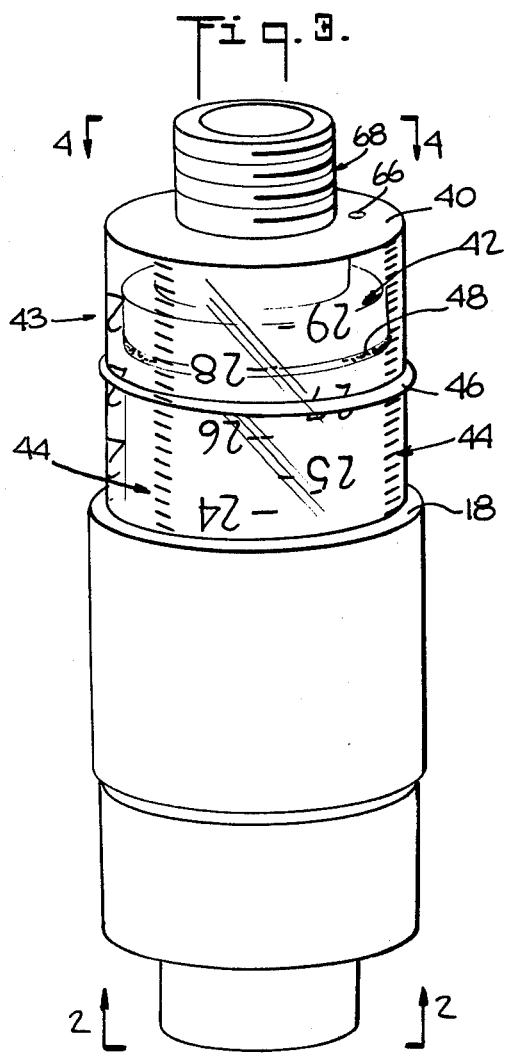
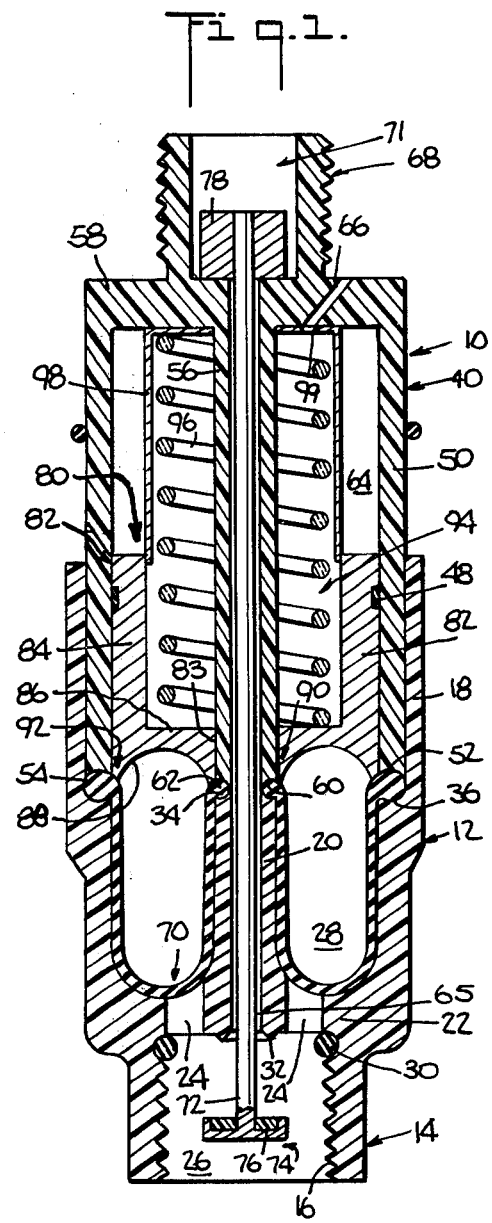
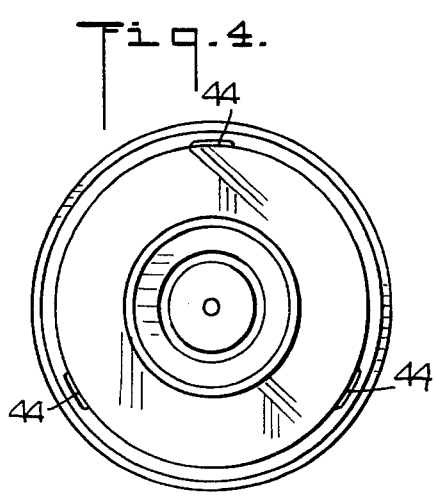
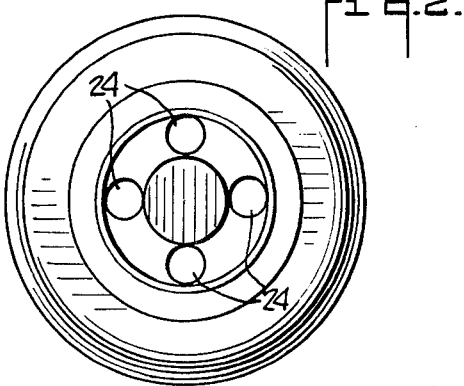

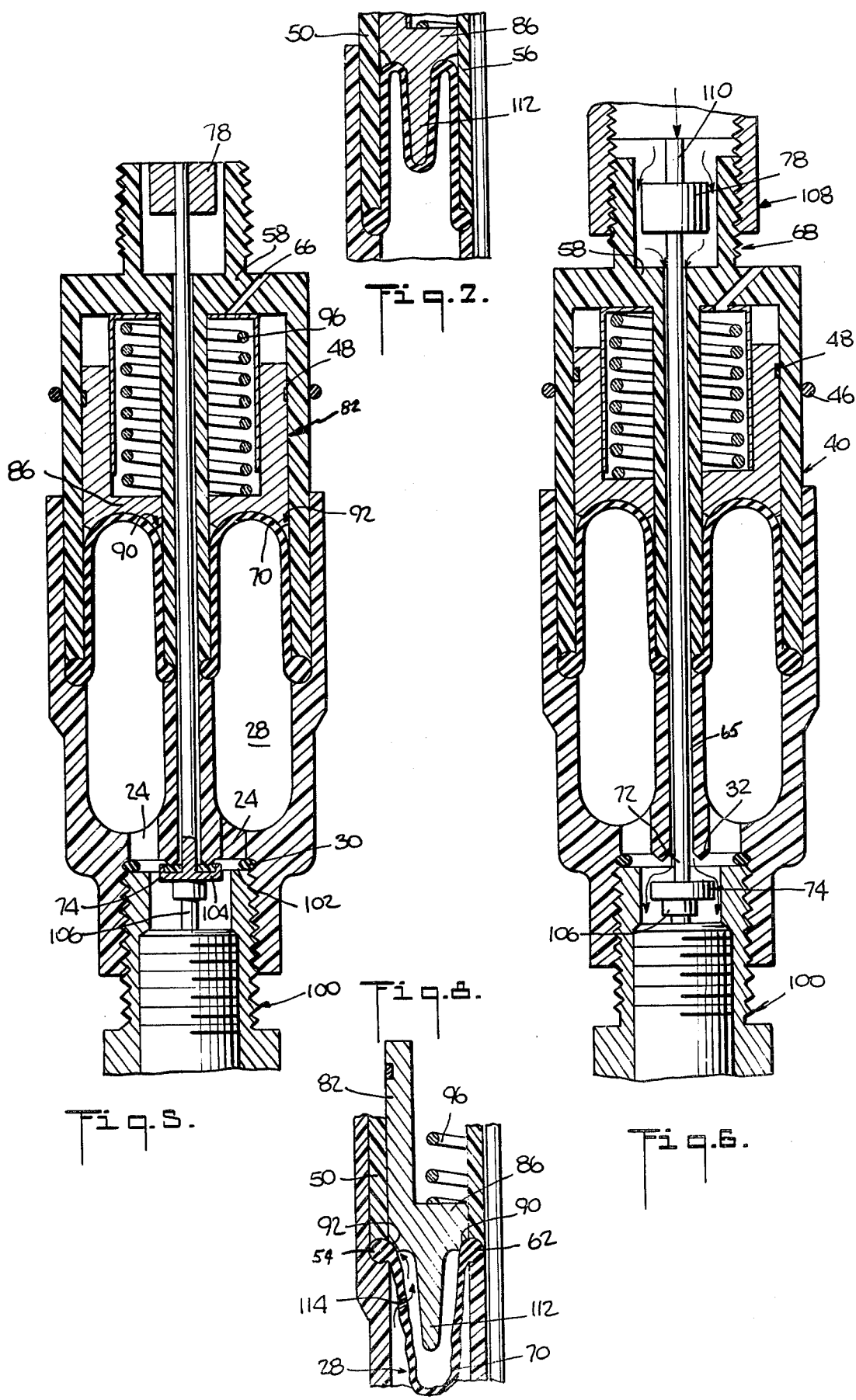

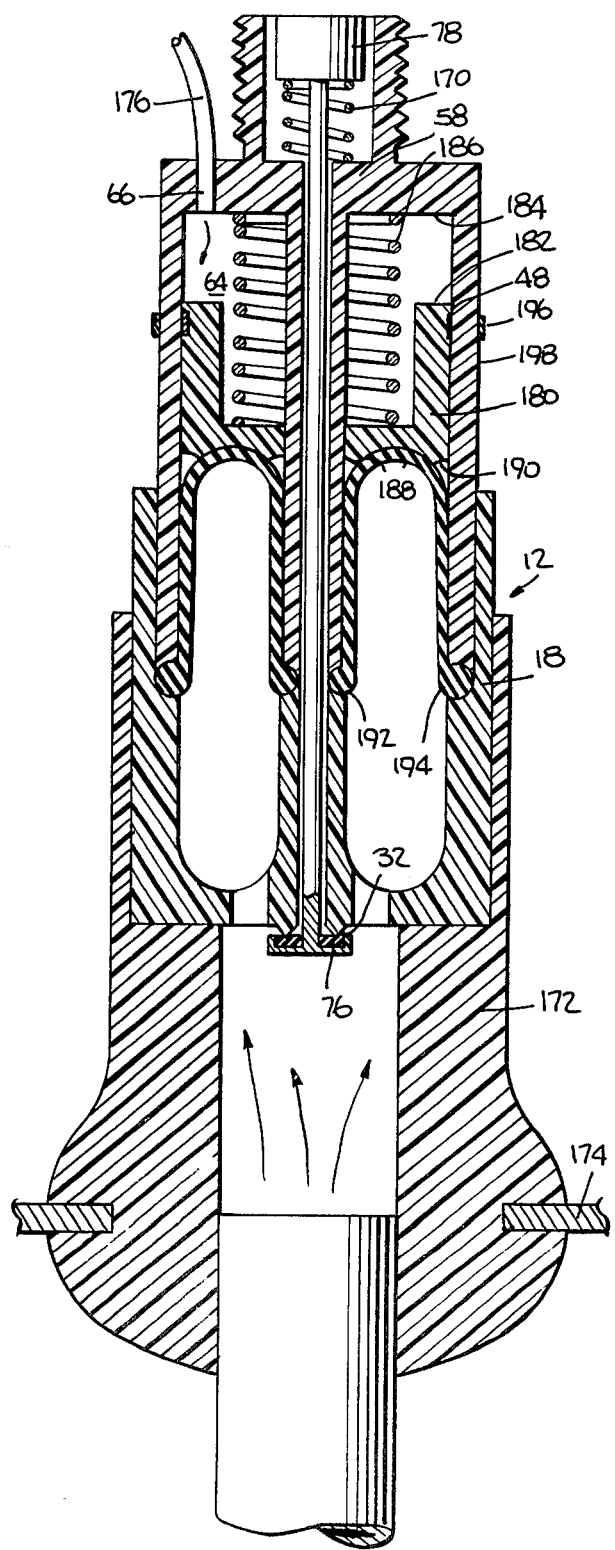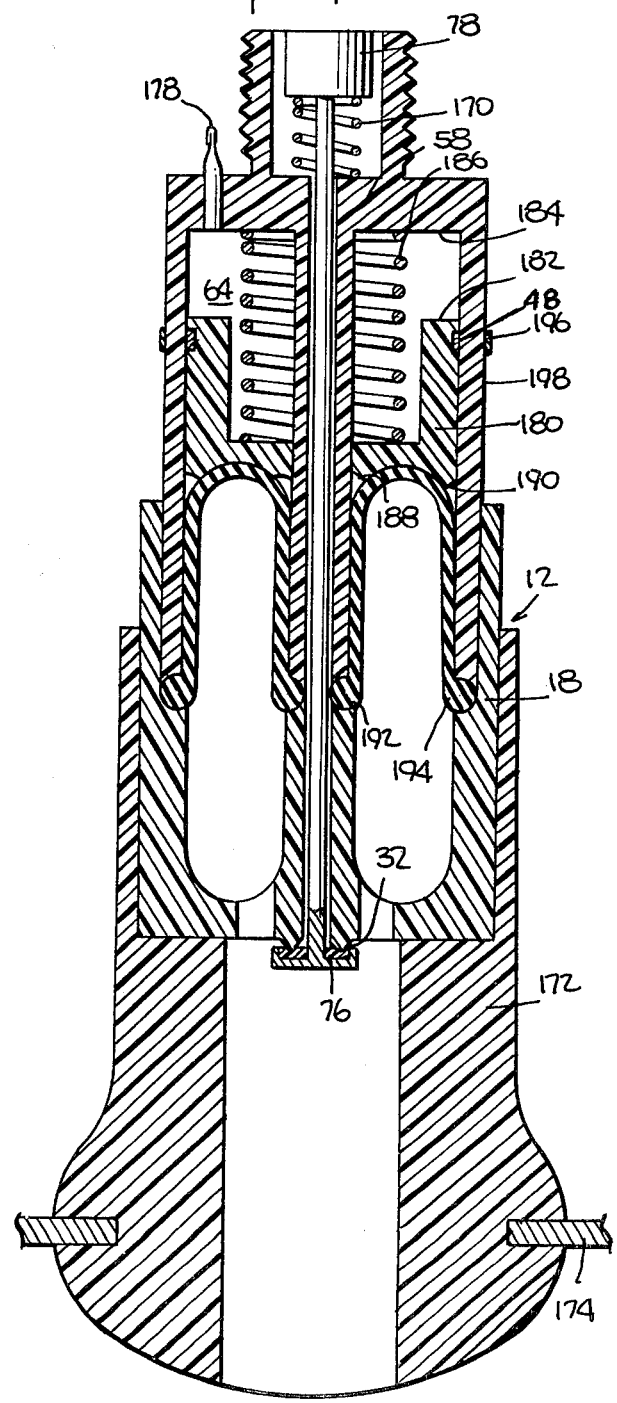

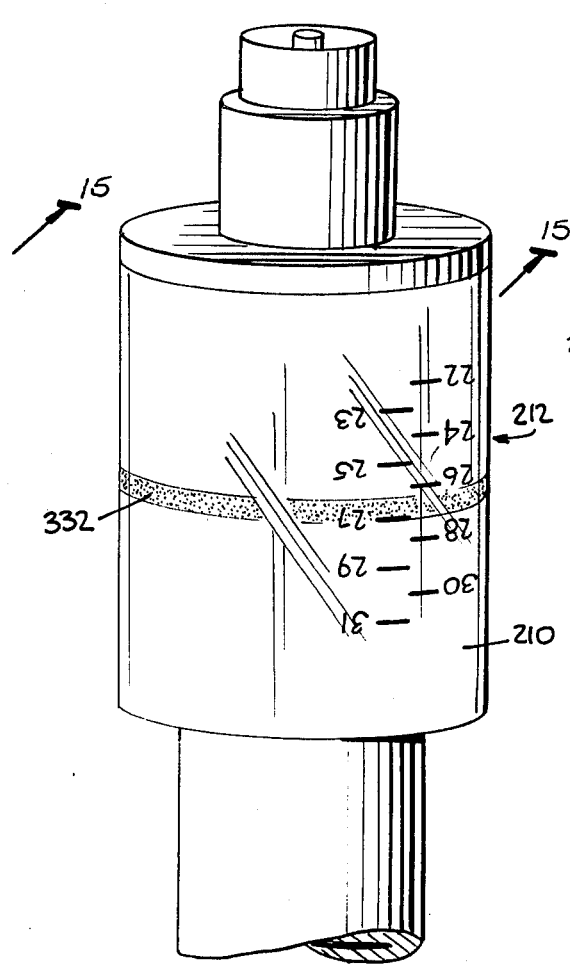
Fig.14.
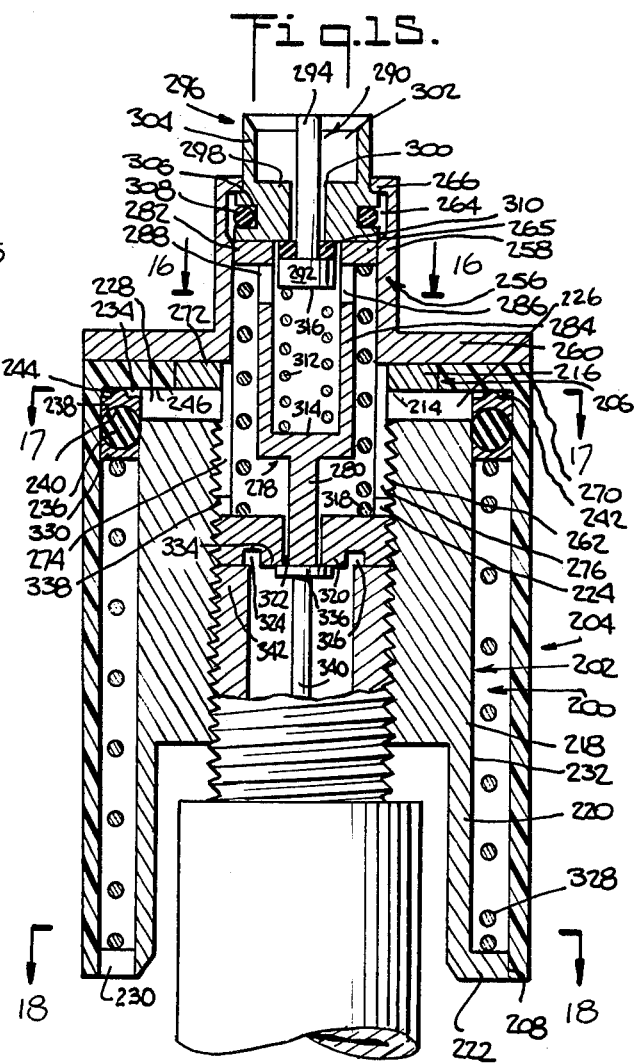
Fig.15.
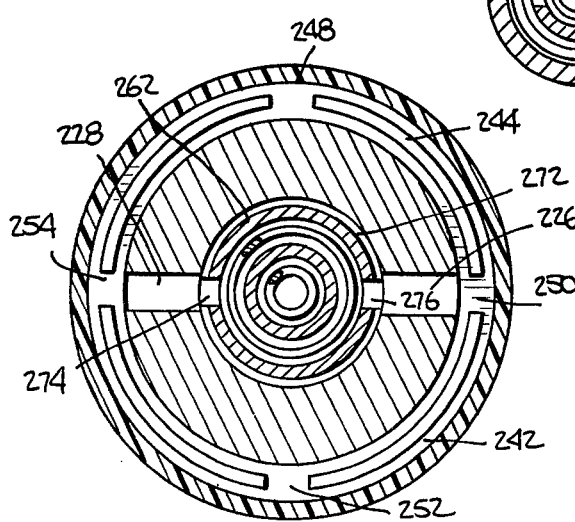
Fig.17.
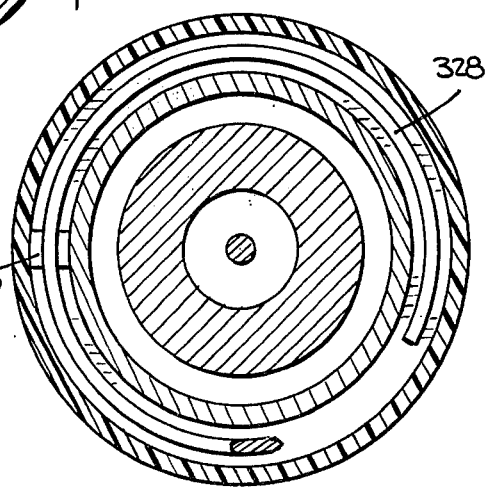
Fig.16.
Fig.18.

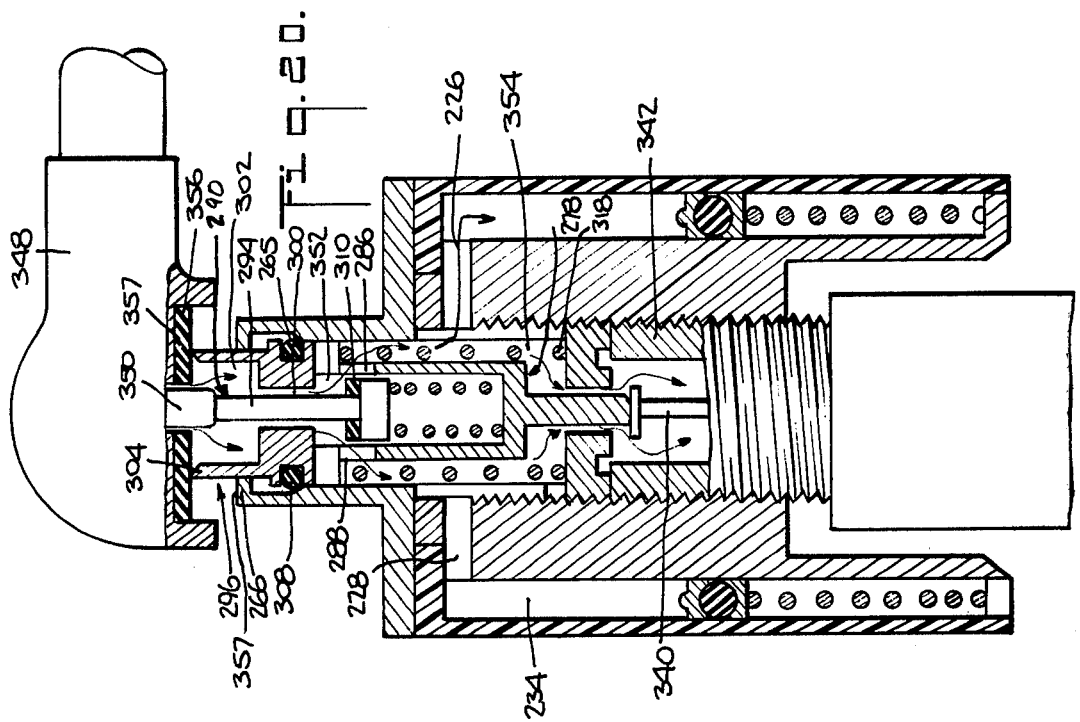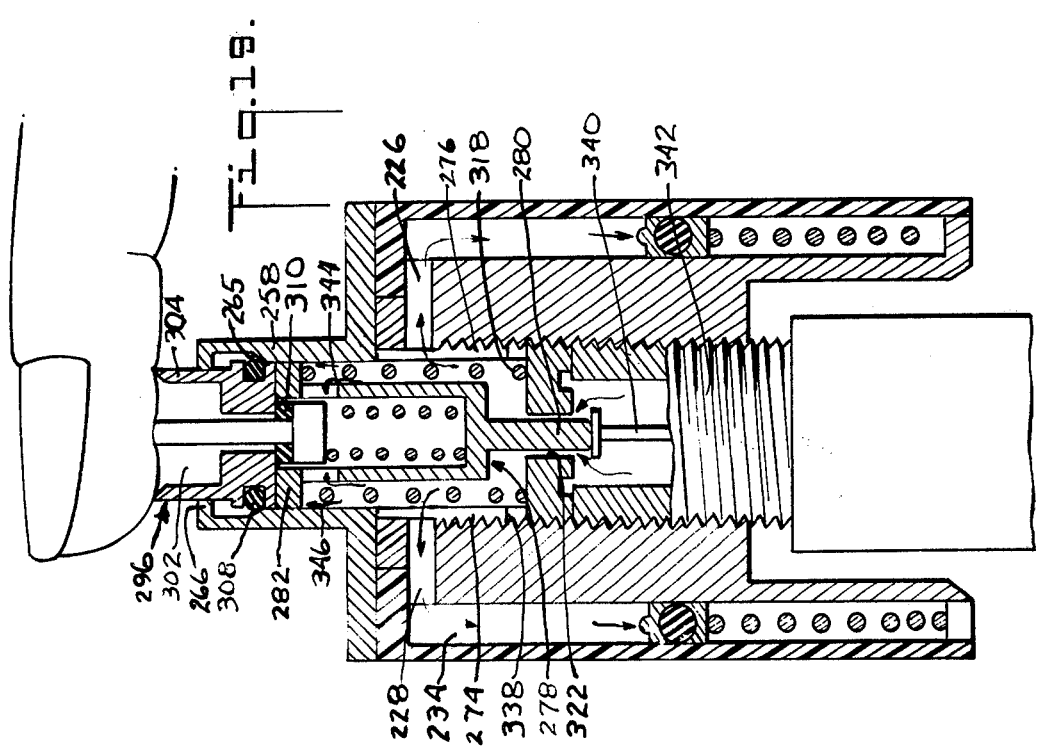

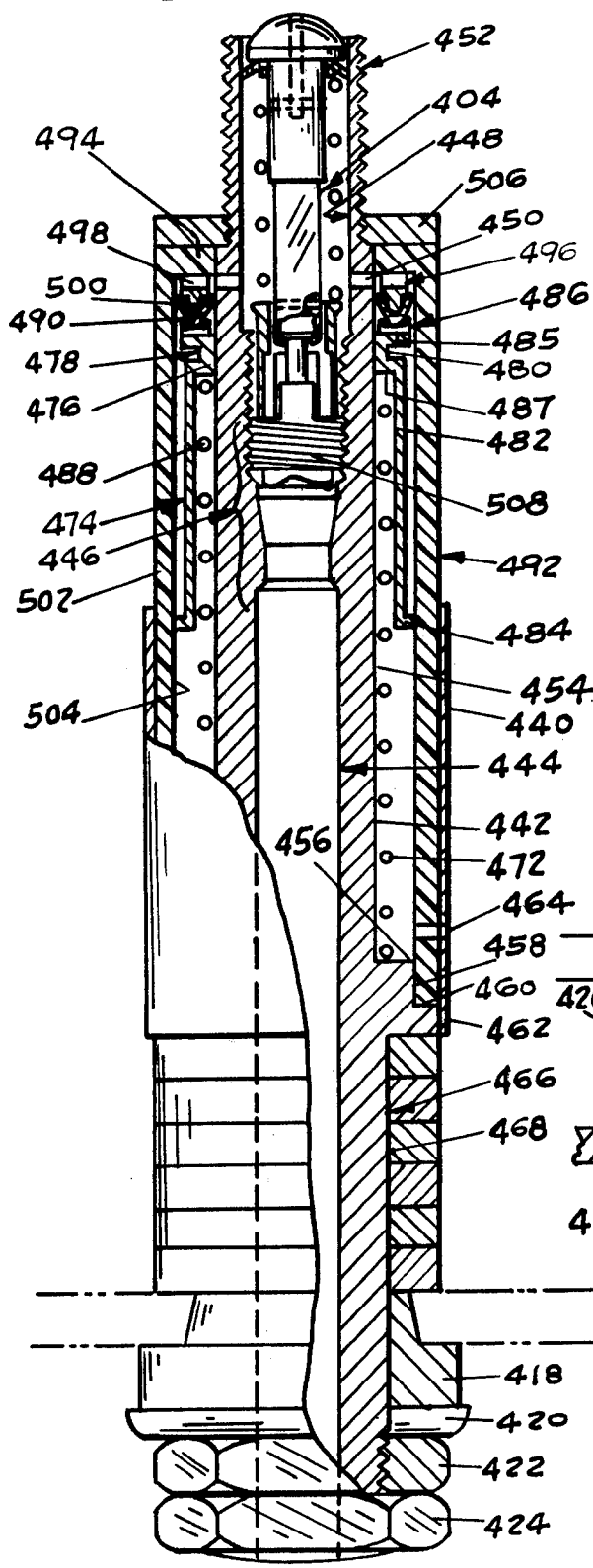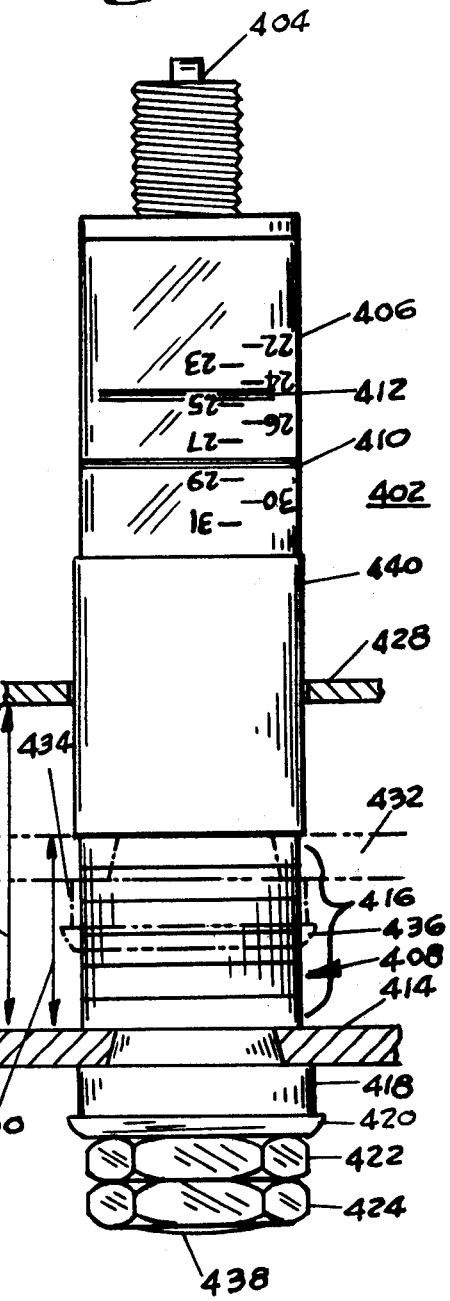

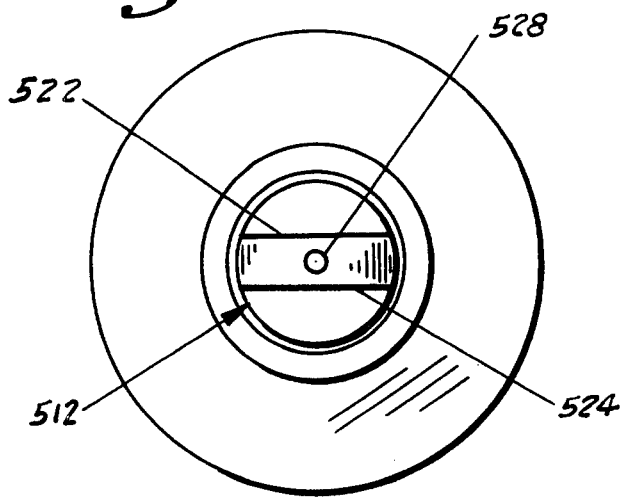
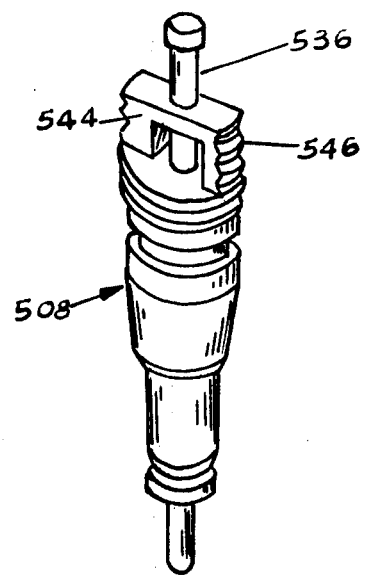
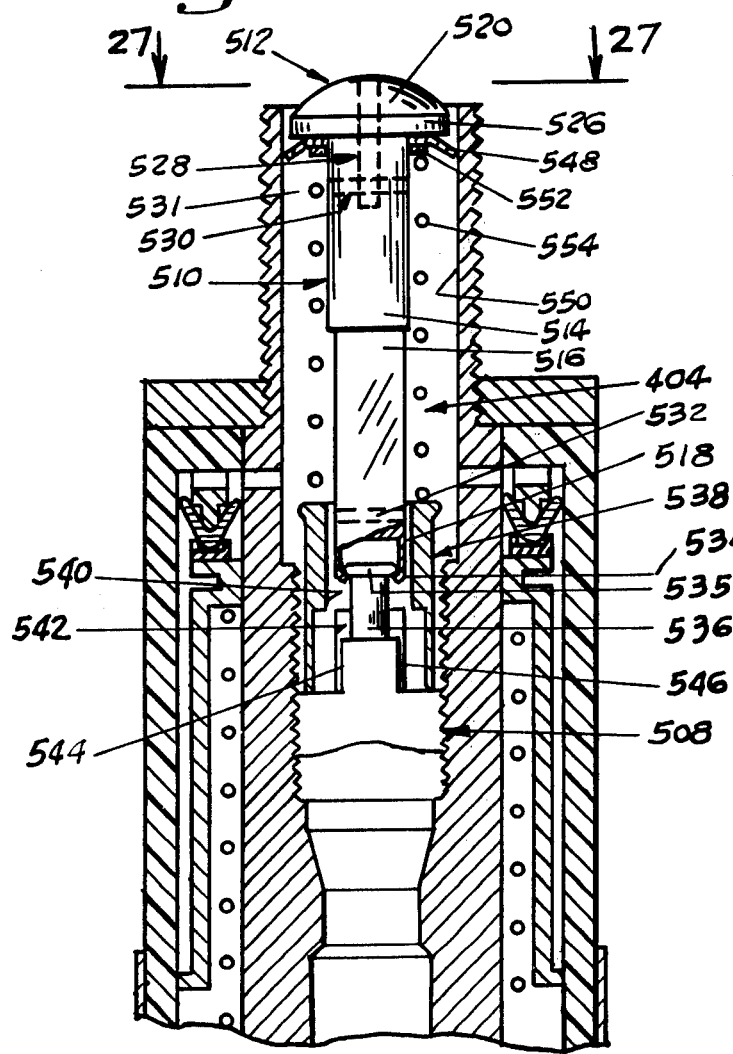
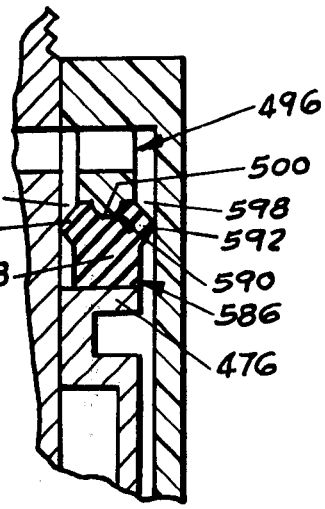

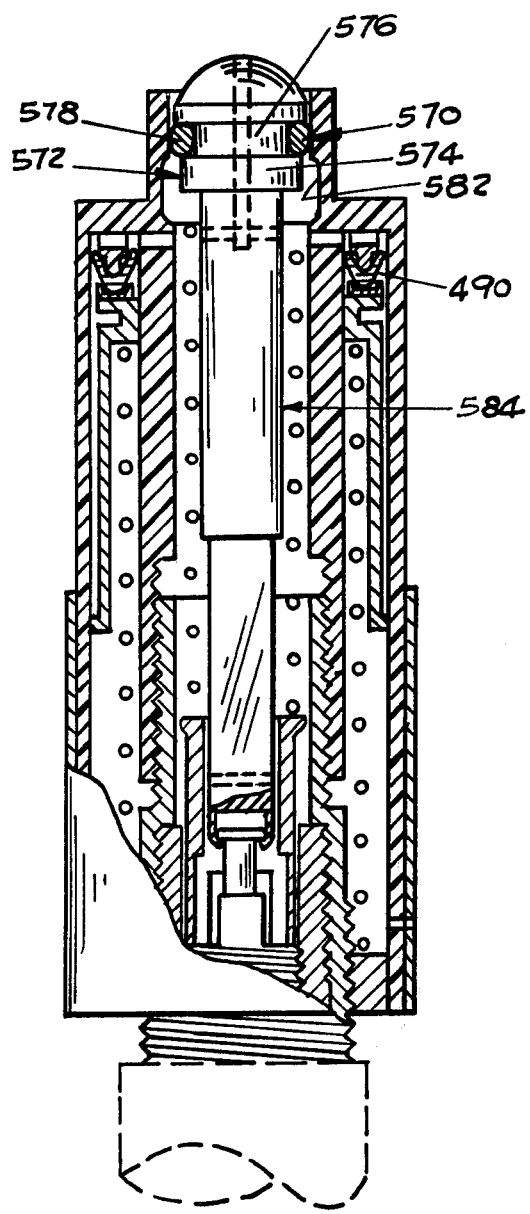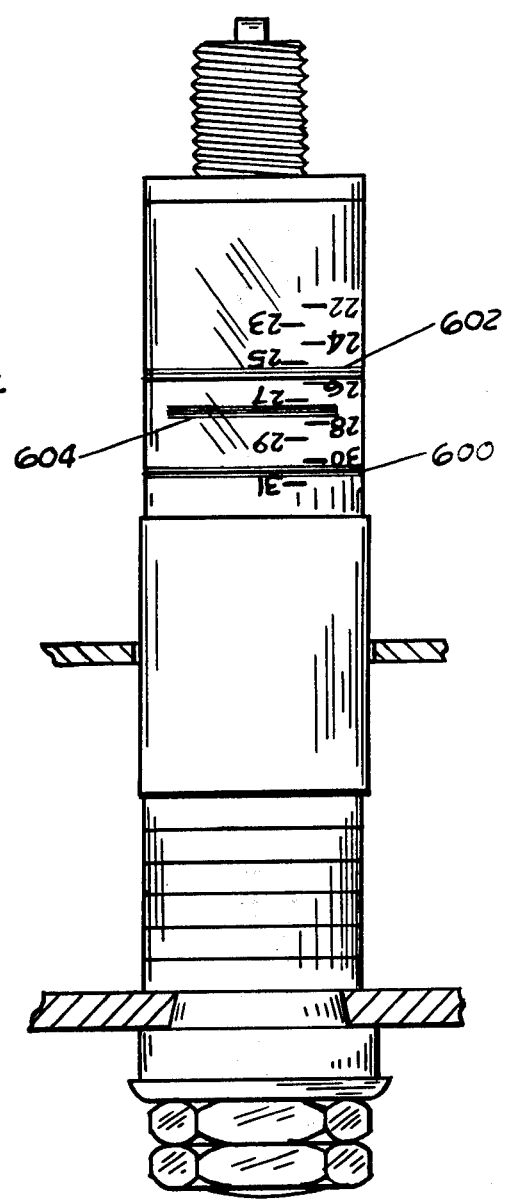
Fig. 31.
Fig. 33.

PRESSURE GAUGE

This application is a continuation in part of application Ser. No. 754,514, filed Dec. 27, 1976, now abandoned; which is a continuation in part of Ser. No. 591,899, filed June 30, 1975, now abandoned; and which is a continuation in part of Ser. No. 464,239, filed Apr. 25, 1974, now abandoned.

BACKGROUND OF THE INVENTION

1. Field of the Invention

This invention is directed to pressure gauges generally, but more particularly to a pressure gauge which can be screwed on to a valve stem or continuously mounted thereto.

2. Description of the Prior Art

Maintenance of gas pressure within an inflated device is a desirable effect particularly in tires used on motor vehicles. Through maintenace of proper tire pressure levels, the operator of the vehicle is assured of an optimum situation with regard to tire wear and good gas mileage, and consequently therefore, is further assured of operating his vehicle in a safer condition. An added benefit of improved tire wear and gas mileage through proper inflation is a reduction in the demand on our precious oil reserves - a fact of major significance in this day of energy conservation consciousness.

The need for maintenance of correct tire pressure prompted the development of a host of various tire pressure gauges with their peculiar advantages and disadvantages. All of us are familiar with the gauge associated with the tire pump found at the local gas station. The desired pressure is first located on the pump meter by a rather crude needle-indicator scheme and then the air hose is applied to the tire. The pump then forces air into the tire until the pressure therein counterbalances the pressure of the air supply for the particular setting. Recognizing the inaccuracies of such a coarse approach, the hand-held gauge was developed. The gas station attendant would place the gauge on the tire valve stem, note the pressure, add air to the tire with the station pump, recheck the pressure, etc. Quite frequently the operator would repeat this operation three or four times for each tire before arriving at the correct level.

In response to the desirability of continuous monitoring of the tire pressure in these situations, attachable or direct mounted gauges were developed. These, typically, provide for a continuous monitoring of the tire pressure but, with the exception of a few devices recently developed, they preclude the inflating of the tire when required without first removing the gauge from the valve stem. More recently, however, gauges have been developed which are directly mounted to the tire and which also allow for the pressurization of the tire while it is in place. Such gauges are described in U.S. Pat. Nos. 3,451,418 and 3,592,218.

The particular device described in the former patent, however, is a rather complex apparatus. This can be concluded from a casual glance at the various figures of the drawings. In particular, from a detailed reading of the patent, the mechanism for preventing leakage from the inflated tire upon a malfunction of any part of the tire gauge, involves a complex spring - "operating member" arrangement, items 45 and 26 respectively in FIG. 2, which typifies the overall complexity of the gauge.

The device described in the '218 patent, requires the operator to hold the body of the gauge with his thumb and forefinger, twist it and then observe the extended gauge portion which protrudes into the cup formed by his hand such that it is partially obscured thereby. Further, this gauge is inordinately long. Lastly, when one is filling a tire through such a gauge, the operator is required to remove the air hose, grasp the body as above, note the pressure, reapply the air hose, etc., until the desired pressure is achieved — a relatively lengthy process.

It is a primary object of this invention to provide a pressure gauge which in line with the simplicity of the overall gauge, provides a simple means for inflating the inflatable device when the gauge is in place and which includes means for sensing the pressure of the device without removing the gauge.

It is an object of one adaptation of this invention to provide a pressure gauge for an inflatable device which is detachably mounted to the device and which is simple in construction and consequently, inexpensive to fabricate.

It is an object of one adaptation of this invention to provide a simple means for "sealing" the gauge upon rupture of its elastomeric part, thereby preventing further leakage from the inflated device.

It is another object of one adaptation of this invention to provide a gauge which continually monitors the pressure of the tire and which allows the operator of the vehicle to tell from afar, whether or not the device pressure has deviated from a previously set pressure.

It is a primary object of still yet another adaptation of the invention hereof which provides for the doubling back of the pressure monitoring portion of the gauge to reduce its length, thus avoiding interference problems.

It is a further object of the adaptation of this invention which includes the doubling back feature, to provide a gauge which utilizes standard valve and other related parts, for simplicity of design and economy of manufacture.

SUMMARY OF THE INVENTION

This invention describes a pressure gauge for measuring the pressure of an inflatable device which comprises means defining a first enclosure including, in part, a transparent section upon which is located in predetermined axial location along the body of the first enclosure, psi indicia which correspond to the anticipated range of pressure within the inflated device. Internal to the first enclosure means is an expandable, diaphragm-like material which is bonded in a suitable fashion to the first enclosure to thereby form an "airtight" secondary enclosure internal to the first. Inlet ports in the first enclosure allow for entry of pressurized gas from the inflatable device into the airtight enclosure internal to the gauge. Positioned on the longitudinal axis of the gauge is a shaft-like member, including a flanged end adapted to operate the valve in the valve stem of the inflatable device, when the gauge is in place on the valve stem, to thereby release the pressurized gas from the inflatable device into the inlet ports as previously mentioned. The shaft extends the length of the gauge and has positioned on the end opposite the flange end, a bushing. The axial length of the bushing is such that when inflating means such as an air pump is applied to the bushing end of the gauge, the shaft or rather the bushing cooperating with the inflating pump moves the shaft axially towards the inflatable device. This enables the higher pressure gas in the inflating means to run the length of the gauge and enter the inflatable device.

Returning to the monitoring aspect of the gauge of this invention, when the pressurized gas is released into the airtight enclosure, the elastomeric diaphragm expands in response thereto. It is "thrown" against a piston-like member axially positioned outward of the diaphragm. Normally, the piston would respond uncontrollably, to the force exerted thereon through the diaphragm by the pressurized gas but the latter force in this case is counteracted by a calibrated spring means which resists the actual movement of the piston in a predictable fashion. The piston, consequently, moves in a proportional relationship to the pressure of the gas in the inflatable device. The piston is suitably marked, for example, with a colored circumferential band which is located at a prescribed position along its axial length. Its location is coordinated with the previously mentioned indicia on the first enclosure forming means such that it aligns itself with the appropriate number signifying the pressure of the gas then internal to the inflatable device.

The piston, spring and diaphragm are designed such that they cooperate with each other by sealing off the airtight enclosure, if the diaphragm ruptures, thereby preventing leakage of the pressurized gas to the "outside world" through the gauge.

Alternate embodiments of the invention call for replacing the diaphragm as described above with a hollow flexible tube or bellows or an "O-ring"-sealed, piston arrangement, all of which implement the basic principles of the invention.

Still another embodiment provides for use of the basic gauge described above as originally supplied equipment incorporated with the inflatable device, such as a tire, when the tire is first supplied by the manufacturer.

Still other embodiments described provide for the doubling back of the airtight enclosure on the barrel of the gauge. These embodiments include a design which is affixed to a standard valve stem as the latter is already in place on a tire rim. A second design of this embodiment includes a standard valve core assembly as part of the gauge itself with the composite inserted in a tire rim as a single gauge-valve unit. In both of these designs, air is released into the gauge proper only when the pressure reading stem is actuated, as opposed to the continuous monitoring feature of the aforementioned embodiments. The released air is directed axially away from the valve stem initially by a first channel, and into a second channel, disposed transversely to the first channel. The latter directs the air radially outward from said first channel and into an airtight enclosure of variable volume. The latter is formed by a piston-like member disposed in a cylindrically shaped enclosure positioned concentrically outward of the valve stem. It increases in volume in response to increasing gas pressure, in an axial direction, toward the inflatable device.

In the gauge-valve design, the valve core assembly is removable using presently available tools and standard procedures.

These and other objects and advantages of the invention will become more apparent from the following detailed description and appended claims taken in conjunction with the accompanying drawings in which:

FIG. 1 is an elevational view of the basic invention.
FIG. 2 is an end view of the gauge as shown in FIG. 3 as viewed in the direction of lins marked 2—2.
FIG. 3 is a perspective view of the gauge of FIG. 1.
FIG. 4 is an end view taken of the gauge of FIG. 3 as viewed in the direction of lines 4—4.

FIG. 5 is an elevational view of the gauge of FIG. 1 shown in place on an inflatable device.
FIG. 6 is an elevational view in section showing the gauge of FIG. 1 in cooperation with gas pumping means to inflate the inflatable device.
FIGS. 7 and 8 depict an improvement in one aspect of the invention of FIG. 1.
FIGS. 9, 10 and 11 shown in elevational, sectional views, alternate embodiments of the subject invention.
FIGS. 12 and 13 shown in elevational, sectional views, an application of the basic invention in situations wherein the gauge is supplied as part of the original equipment.
FIG. 14 is a perspective view of yet another embodiment of the subject invention.
FIG. 15 is a cross-sectional, elevational view taken along lines 15—15 of FIG. 14.
FIG. 16 is a cross-sectional view taken along lines 16—16 of FIG. 15.
FIG. 17 is a cross-sectional view taken along lines 17—17 of FIG. 15.
FIG. 18 is a cross-sectional view taken along lines 18—18 of FIG. 15.
FIG. 19 is an elevational view of the gauge of FIG. 15 being used in one mode of operation.
FIG. 20 is an elevational view of the gauge of FIG. 15 being used in a second mode of operation.
FIG. 21 is an elevational view of a variation, in part, of the gauge of FIG. 15.
FIG. 22 is an elevational view of a variation, in part, of the gauge of FIG. 15.
FIG. 23 is an elevational view of a variation, in part, of the gauge of FIG. 15.
FIG. 24 is an elevational view of still another embodiment of the subject invention.
FIG. 25 is a partial, cross-sectional, elevational view of the embodiment of FIG. 24.
FIG. 26 is a cross-sectional, elevational view of a part of the embodiment of FIG. 24.
FIG. 27 is a plan view taken along lines 27—27 in FIG. 26.
FIG. 28 is a perspective view of a standard valve core assembly.
FIG. 29 is a cross-sectional, elevational view of the embodiment of FIG. 24 being used in the reading mode.
FIG. 30 is a cross-sectional, elevational view of the embodiment of FIG. 24 being used in the inflating mode.
FIG. 31 is a cross-sectional, elevational view of a modified version of the embodiment of FIG. 24.
FIG. 32 is a partial, cross-sectional view of one type of seal which can be used in the embodiment of FIG. 24.
FIGS. 33, 34 and 35 are elevational views of various adaptations of the embodiment of FIG. 24.
FIG. 36 is an elevational view of still another embodiment of the invention.
FIG. 37 is a plan view taken along lines 37—37 in FIG. 36.
FIG. 38 is a perspective view of the seal employed in the embodiment of FIG. 36.
FIG. 39 is a perspective, sectional view taken along lines 39—39 in FIG. 38.
FIGS. 40 and 41 are partial, sectional views of an aspect of the design of the embodiment of FIG. 36.
FIGS. 42, 43 and 44 are various alternative caps which can be employed with the various embodiments depicted.

DESCRIPTION OF THE PREFERRED EMBODIMENT

Figure 11:
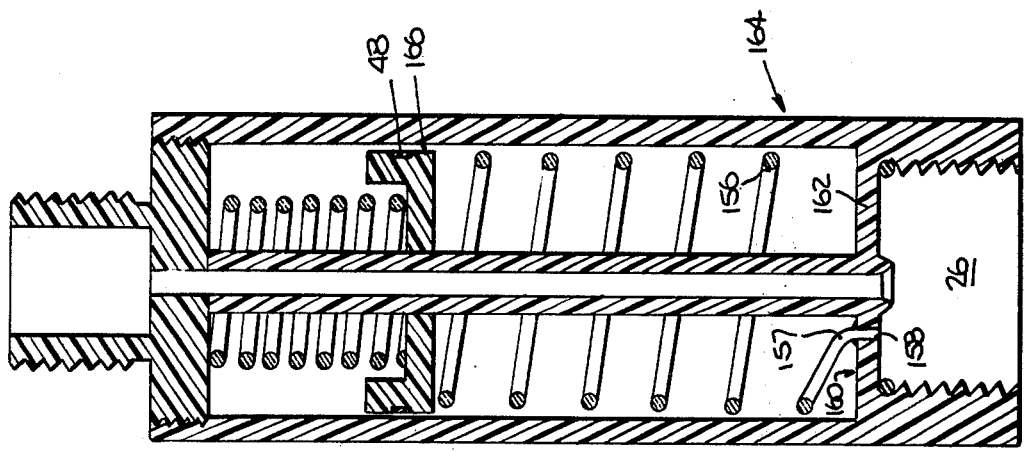

In the following discussion it will be assumed that the device to be inflated is the automobile tire. This certainly is not be construed as a limitation on the versatility and application that the gauge has but only illustrative of its use.

Referring to FIG. 1, there is depicted a basic design which implements the principles of the subject invention. The device as shown includes, first of all, housing means 10 which form a first enclosure. The housing means 10 comprises a lower housing portion 12 which preferably, is fabricated from an opaque plastic or similar material. The lower housing in the preferred embodiment shown is, typically, cylindrical in shape. It includes a lower end 14 which has an internal thread 16, enabling the gauge to be screwed on to a tire valve stem. The lower housing 12, includes an outer cylindrical wall 18 which extends approximately 1/2 the length of the overall gauge. Internal to the cylindrical wall 18 and coaxial with the longitudinal axis of the gauge is an inner cylindrical wall, 20. The inner cylindrical wall is connected to the outer cylindrical wall by a cylindrical disc-like section 22, which lies in a plane perpendicular to the longitudinal axis of the gauge. This disc-like portion includes a plurality of cylindrical, inlet ports 24 which run parallel to the longitudinal axis of the gauge. The inlet ports 24 provide a means whereby the chamber 26, defined by the lower end 14 of the housing 12 and the cylindrical disc 22, communicates with the annular chamber 28 formed above the cylindrical disc 22, between the inner cylindrical wall 20 and the outer cylindrical wall 18.

Sandwiched between the internal thread 16 and the under side of cylindrical disc is a standard "O-ring" 30 constructed from an elastomeric material such as rubber.

Additionally, integral with an protruding from the bottom side of the cylindrical disc 22 in an axial direction, is a knife-like annular edge, 32.

The upper end 34 of the inner cylindrical wall 20 is formed in a U-shaped fashion. Similarly, the outer cylindrical wall includes a U-shape ridge 36, internal of the wall 18 which also extends the full perimeter of the wall 18.

The first enclosure means, 10, also includes an upper housing 40 which is of the same general cylindrical shape as the lower housing 12. Whereas the lower housing can be made of an opaque plastic material for reasons soon to become obvious, the upper housing 40 is made, of a transparent plastic material. Embossed on the outer surface of the upper housing, is a suitable arrangement of numbers 42 in FIG. 3 positioned sequentially along the axial length of the upper housing wall beginning with the lower number towards the bottom of the gauge, as viewed in FIG. 3, ascending to a higher number at the top of the gauge. These numbers represent the pressure range of a gauge given its particular application - e.g. when used to measure tire pressure the range would be that shown in FIG. 3. To improve the visibility aspect of the pressure gauge of this invention, these numerals are displayed in identical groupings, spaced 120° apart, about the perimeter of the upper housing wall. One of the other arrangement of numbers can be seen located at 43 in FIG. 3.

Interposed between each grouping of numerals just described, at 120° spacing, are three groups of axially positioned serrations 44. These cooperate with another "O-ring" 46 and the indicating band 48, whose function and location are described later on to provide a ready indication of the deviations of the tire pressure from the previously set level.

The upper housing 40 includes an outer cylindrical wall 50 which has an outside diameter virtually the same as the inside diameter of outer cylindrical wall 18 of the lower housing 12. When finally assembled the outer wall 50 nests within the outer wall 18. The bottom end of the outer cylindrical wall 50 as viewed in FIG. 2, is U-shaped and together with the U-shaped ridge 36 forms substantially, a circular groove into which the diaphragm ring 54 is positioned as soon to be described.

Coaxial with the outer cylindrical wall 50 and extending, axially, approximately the same length as the outer wall 15 is an inner cylindrical wall 56. Both walls are connected to each other by a disc like member 58 which lies in a plane substantially perpendicular to the longitudinal axis of the gauge and which, again, is integral both with the outer cylindrical wall 50 and the inner cylindrical wall 56. The inner cylindrical wall 56 also includes at its bottom end, a U-shaped ridge 60 which extends the perimeter of the inner cylindrical wall 56 and which, together with the ridge formed at the upper end 34 of the inner cylindrical wall 20 provides a circular groove into which the inner ring 62 of the previously mentioned diaphragm is positioned. Both inner walls, 20 and 56, are hollow so that when they are aligned in final assembly they form a cylindrical passageway 65, which runs the length of the gauge, connecting chamber 26 to chamber 71, the latter being formed as described below.

An annular chamber 64 is formed between the outer wall 50 and the inner wall 56. Communicating between this annular chamber 64 and the environment outside the gauge, for reasons soon to become obvious, there exists a vent hole 66 which passes through the disc-like member 58.

Extending axially upward from the disc like member 58 is a cylindrical protrusion 68 which is adapted in a known fashion to fit a pump inflating hose. The protrusion, 68, forms a third annular chamber 71. The protrusion 68 is threaded to accept a standard protective cup (not shown).

When completely assembled there is interposed between the U-shaped ridges of the inner and outer walls 20 and 18 of the lower housing 12 and the inner and outer walls 56 and 50, respectively, of the upper housing 40, a diaphragm assembly 70 made of a highly flexible, low friction material such as rubber. It includes an inner ring section 62, sandwiched between opposing U-shaped ridge in the inner walls 56 and 20 and an outer ring 54 interposed between the U-shaped ridges of outer wall 50 and ridge 36. The diaphragm rings are interconnected by an annular piece of flexible rubber material which for purposes of the particular configuration illustrated in FIG. 1, is essentially U-shaped. When finally assembled, rings 54 and 62 are bonded to the ridge sections of the inner and outer walls of both housings. This insures an airtight enclosure into which the pressurized air within the tire is released.

As part of the gauge, means are provided for releasing the pressurized air in the tire into the gauge. Further the releasing means is adapted to provide for inflating the tire when the gauge indicates that the pressure has dropped below a desired minimum. The pressure releasing means preferably includes a steel cylindrical shaft 72 which extends the length of the gauge and which is located at the axial center of the gauge within the passageway 65 formed by the inner wall 20 and the inner wall 56. The shaft 72 terminates in a flange 74 at the lower end 14 of the gauge. The flange lies in a plane perpendicular to the axis of the shaft 72 and includes an annular recess into which is placed a sealing gasket 76 which cooperates with knife edge 32 to form a seal for purposes soon to be described. Press fitted onto the opposite end of the shaft 72 is a bushing 78 generally made of steel.

Positioned substantially in the upper annular chamber 64 is located means, 80, for both controlling the variation of the volume of annular chamber 28 and for giving to the observer an indication of the pressure in the tire.

In the preferred embodiment, means 80 includes a piston like member 82 of cylindrical shape which has an outside diameter substantially equal to the inside diameter of the outer wall 50. The piston member is made of a smooth, plastic-like material which minimizes friction between the surfaces, enhancing the sensitivity and accuracy of the gauge.

The piston like member 82 includes an axially extending cylindrical wall 84 which barely contacts the inner surface of outer wall 50 and a section 86, integral with the cylindrical wall portion 84 and perpendicular thereto. The inner axially extending surface 83 of the horizontal section is in substantial contact with the outer surface of inner wall 56. The underside 88, of the horizontal section 86 has generally, a U-shaped configuration. The inner and outer extremities, 90 and 92 respectively, of the U-shaped underside are contoured to take the shape of the inner and outer diaphragm rings 62 and 54 respectively. This provides an "airtight" seal in a manner soon to be described if and when the diaphragm 70 ruptures. The arcuate contour of the extremities 90 and 92 is better seen in FIGS. 5 and 6.

Cylindrically shaped piston member 82 defines a cavity 94 between the inside surface of wall 84 and the outside surface of wall 56. Nested in this cavity and extending the axial length of the gauge between horizontal section 86 and disc like member 58 is a callibrated coil spring, 96. Spring 96 is preferably made from a suitable spring steel selected to have the necessary spring constant to counteract the force exerted on the piston like member 82 by the pressurized gas in chamber 28 acting through diaphragm 70.

Depicted in FIG. 1 is a cylindrical, cup-shaped, covering device 98 of suitable opaque material, such as plastic which hides the "exposed" end of the spring 96 for the purpose of enhancing the appearance of the gauge. Where employed, the covering device includes a vent hole 99 to enable air otherwise under compression in chamber 94, to escape.

The indicating feature of means 80 is provided, in combination, by an annular colored band 48 which preferably is painted in a suitable annular recess in cylindrical wall 84. This insures that the band is not rubbed from the outer surface of the cylindrical wall 84 due to the constant axial movement of the piston member 82 within the chamber 64 when the gauge is in place.

ASSEMBLY

The unit is assembled by first positioning the opaque cover 98 in the upper housing portion 40. The coil spring 96 is next placed within the cover 98 followed by the piston member 82.

The diaphragm is positioned in the lower housing such that rings 54 and 62 rest in grooves 36 and 34 respectively. The rings 54 and 62 are secured thereto by a suitable bonding material.

The outer wall 18 and the lower housing 12 are then either slipped over the outer cylindrical wall 50 of the upper housing 40 and bonded thereto or, alternately, it is threaded onto the upper housing with suitable bonding cement calking the threads to insure an airtight seal between the contacting surfaces of the two outer walls. Prior to mating the upper and lower housings, bonding material is added to ridges 52 and 60 to thereby provide an airtight seal between those surfaces and the top portion of diaphragm rings 54 and 62.

The means for releasing or suppling air to the tire is next positioned in the gauge. The flange-shaft unit 74-72 is inserted in the passageway 65. The steel bushing 78 is then press fitted over the top end of the shaft 72 thereby retaining the latter in place in the gauge. As can be best appreciated from FIG. 5, although not depicted therein, a coiled spring member can be interposed between the bottom of the bushing 78 and the top of the disc like member 58 within the chamber 71 to minimize any rattling of the shaft when the gauge is disconnected from the tire stem, and improve the seal between gasket 76 and edge 32.

FIGS. 5 and 6, are useful in understanding the operation of the gauge. The gauge is screwed on to the tire valve stem 100 until the top of the valve stem 102 contacts the O-ring 30, comprising it as shown. Considering the design of the standard tire valve stem, the height of the flange member 74 of the gauge is such that when the gauge is threaded on the standard valve stem 100 the underside 104 of the flange 74 contacts the valve actuating rod 106 depressing it a sufficient amount, typically on the order of 0.025 to 0.032 inches, to enable a sampling of the pressurized gas within the tire to enter the annular chamber 28 through inlet ports 24.

The pressurized gas contacts the diaphragm 70 forcing it upward as viewed in FIG. 5 and eventually to the point where it assumes the contour as depicted in FIG. 5 which includes conforming itself to the U-shaped underside section 88 of piston 82. The piston member 82 is forced upward in response to the pressure exerted by the gas through the diaphragm 70. Coil spring 96 as a consequence is compressed between the section 86 and the disc like end cap 58. Because the diaphragm 70 forms an airtight barrier between chambers 28 and 64, the air in compression in chamber 64 is forced out of chamber 64 through vents 99 and 66. As noted earlier the spring constant for spring 96 is chosen so that the force exerted by the spring in opposition to the force exerted by the pressurized gas on the piston like member 82, is such that when the annular band 48 is opposite the appropriate pressure reading on the numerical display 42, the spring force exactly balances the force exerted by the pressurized gas.

If it is desired to further inflate the tire, an air pump hose 108, as shown in FIG. 6, may be pressed on to the protrusion 68. The valve stem rod 110 positioned in the head of the pump hose 108 contacts the bushing 78. The bushing 78 is depressed and in turn forces a downward movement of shaft 72 and flange 74. The sealed formed between gasket 76 and the knife-like annular ridge 32 is "broken" enabling pressurized gas supplied from a compressor (not shown) to pass along the length of the gage through the passageway 65 past ridge 32 and into the valve stem 100 located on the device to be inflated. The axial length of the bushing 78 is such that the bottom side of bushing 78 as viewed in FIG. 6 will not contact the top of the disc like member 58 when the inflating hose 108 is in place. This insures that the seal formed between the gasket 76 and the knife-like ridge 32 is "broken", enlabing the tire to be inflated.

As the pressure of the gas in the inflated device increases the piston member 82 rises further in chamber 64. The person inflating the device will remove the inflating hose 108 when the annular band 48 has reached the desired pressure level. At this time the operator would remove the hose 108 and slip O-ring 46 to a new position on the gauge opposite the band 48. A convenient reference is established which subsequently enables the operator to determine whether or not the tire has lost pressure.

Alternately, it may be desirable to release a certain amount of pressurized gas from the tire. In this case, the operator would depress the shaft 72 by pressing down on the bushing 78, thus breaking the seal between the gasket 76 and the edge 32. Downward movement of the shaft will cause the valve actuating rod 106 to further depress resulting in the venting of pressurized gas from the tire, via the passageway 65. The bushing is kept depressed until the annular band drops to a position opposite the desired pressure.

FIGS. 7 and 8 depict in a partial, sectional view, an improved version of the underside surface of the piston member 82 which is employed where it is important to have a more sensitive gauge. The improvement calls for providing a cylindrical appendage 112, ending axially from section 86. The cylindrical appendage improves the sensitivity and thus the accuracy of the gauge by reducing the frictional forces occurring between the surface of the diaphragm and the walls which the diaphragm contacts, viz., the inner surface of wall 50 and the outer surface of wall 56. Whereas in the previously discussed U-shaped design, the counteracting force exerted on the piston member 82 by the spring 96 had to overcome a shearing or frictional force at the interface between the diaphragm and the two cylindrical walls as well as compressive forces in the diaphragm, the improvement of FIG. 7 need only overcome a relatively low adhesive force between the diaphragm and the wall. In effect the diaphragm is "peeled" from the two wall surfaces. Thus the calculations determinative of the spring constant can assume, more correctly, "zero" frictional forces with the result that a more sensitive and accurate gauge is developed.

FIG. 8 illustrates an aspect of the invention, common to the design previously described, i.e., FIGS. 1, 5 & 6, but which is better pictorialized in FIG. 8. This feature might be called a "fail safe" capability. In effect, this "fail safe" capability prevents the gauge from becoming a device for deflating the tire when the former malfunctions, particularly through rupture of the diaphragm 70. The possibility of diaphragm rupture is a practical consideration after the gauge has been utilized for extended periods of time. This is due in part to the continual up-down movement of the piston in response to pressure fluctuations in the tire. This pressure fluctuation is a continuing thing due in part to the rough road conditions to which the tire may be subjected, the increase in pressure due to tire heating and similar other disturbances. A ruptured condition is demonstrated in FIG. 8 by opening 114. Absent the "fail safe" design the air passing from the chamber 28 through opening 114 would pass between the side of the piston 82 and the wall 50. However, when the diaphragm ruptures causing a reduction in the force supporting the piston 82 in an elevated position, spring 96 forces the piston 82 downward as viewed in FIG. 8 until the inner and outer extremities 90 and 92 of the underside of the piston contact the diaphragm rings 62 and 54 respectively. sufficient contact area is provided between the rings and the contacting portion of the grooved extremities so that the piston 82 is prevented from any further downward movement. At worst, the pressure in the tire is reduced to an amount such that the force exerted on the piston 82 by the remaining pressurized gas is just balanced by the spring force exerted by spring 96 at the point of contact between the grooved extremities and the diaphragm rings. Further deflation is prevented.

The person inflating the tire can detect the fact that the diaphragm in the gauge is ruptured when he goes to inflate the tire. The tire would expand in response to the increasing air pressure but the gauge will fail to respond due to the exiting of the gas through the ruptured diaphragm. Also the piston 82 would rise up ever so slightly causing a passing of the air through the vent hole 66 giving use to a hissing sound. Noting this, the operator knows he has a defective gauge.

Figure 10:
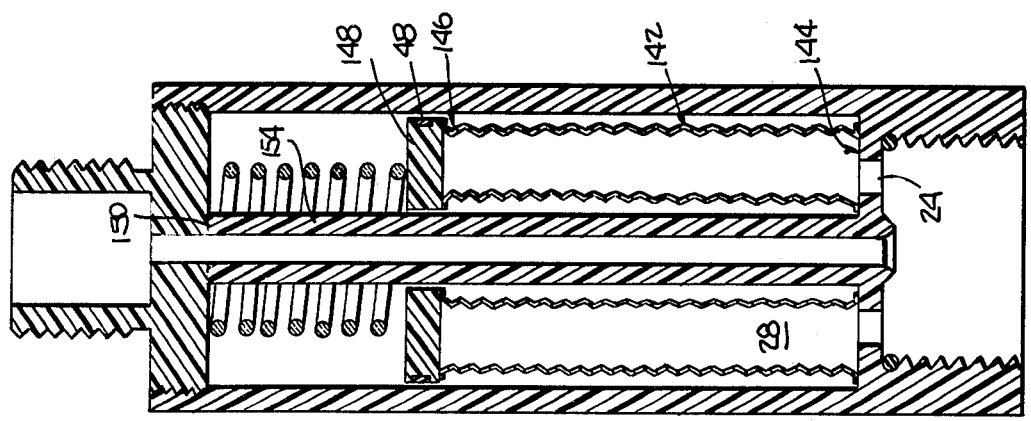
Figure 9:
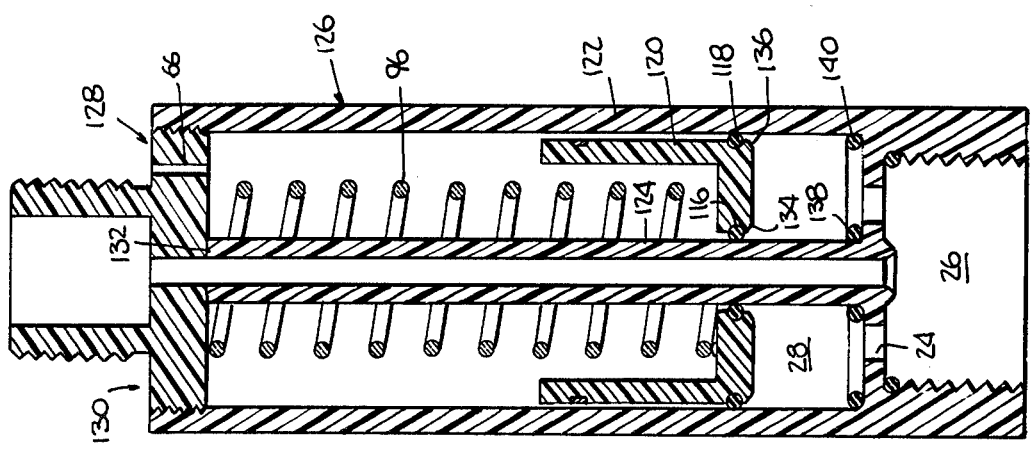

FIGS. 9, 10 and 11 are particular variations of the previously discussed design where alternate means for forming the airtight enclosure of variable volume are depicted. For the purposes of discussion with regard to FIGS. 9, 10 and 11, the means for releasing the pressurized gas from the inflated tire, viz., the shaft-flange-bushing arrangement 72, 74 and 78 respectively, will not be discussed. Suffice it to say that the operation of this aspect of the particular embodiments of FIGS. 9, 10 and 11 is essentially identical to that previously described.

Referring to FIG. 9, the chamber 26 vents through inlet ports 24 into a air-tight volume 28 of variable volume which is maintained air-tight by two O-rings one 16 and one 18 which form suitable airtight seal between piston 120 and housing walls 122 and 124. The overall design of the embodiment of FIG. 9 as far as the housing construction is concerned is somewhat simplified in that a gauge consists of a basic cylindrical housing 126 of clear plastic with an end cap 128 either bonded or threaded into the cylindrical opening at the top 130 of the gauge.

Two additional O-rings 138 and 140 are positioned in the bottom of the chamber 28, each of the O-rings having a diameter substantially equal to the diameter of housing walls 124 and 122, respectively. When the O-rings 116 and/or 118 wear to a point that they no longer provide an airtight seal between the piston 120 and the surfaces of the housing walls 122 and 124, the spring 96 will force the piston downward as viewed in FIG. 9 until the chamfered edges 134 and 136 contact the O-rings 138 and 140 respectively. Through this technique, the "fail safe" capability described in the earlier embodiment is provided in this configuration.

Suitable pressure indicia would be located on the outer surface of wall 122 as well as serrations for locating the O-ring 46. The indicating aspect of the gauge is essentially the same as the one previously described with regard to the embodiment of FIG. 1.

FIG. 10 discloses an embodiment wherein the chamber of variable volume 28 is formed by an annularly shaped bellows, 142. One end of the bellows 142 is bonded to the bottom of the chamber 44 such that it encompasses the inlet ports 24, thus providing an airtight enclosure. The opposite end 146 of the bellows is "capped off" by a lightweight plastic, disc-like member 148, which is bonded in place to the end 146 of the bellows. The disc like member 148 would have the indicator band 48 annularly disposed about its perimeter with corresponding pressure markings again positioned axially along the outer surface of the housing wall. The housing construction is similar to that shown in FIG. 9 with the exception that the venting hole 66 is not required. That is so because of sufficient clearance between the member 148 and the inside walls of the housing. In this configuration provided the seam 150 between the end cap 152 and inner cylindrical housing 154 is bonded, there is no need for the "fail safe" additions of the previously discussed designs.

FIG. 11 shows yet another embodiment, similar to those just described but where the airtight volume is provided by a flexible, helically-shaped, hollow tube 156 which communicate with chamber 26 through port 158. In this configuration upon release of the pressurized gas of the inflated tire, the gas enters the helical coil 156 at end 157 which is bonded to the inner surface 160 of the bottom portion 162 of the housing 164. The coil in response thereto extends itself in an axially upward direction as viewed in FIG. 11 much in the manner of the well known Bourdon tube. This conversion of pressure to axial displacement is transmitted to piston member 166 which is made of opaque plastic and which includes the familiar indicator band 48. The design of the tube and the spring constant of the spring 96 are selected so that the annular band 48 is positioned opposite the corresponding pressure indication on the surface of the housing 164. Again, as was the case with the device of FIG. 10, there is no requirement for a vent hole such as that shown at 66 in FIGS. 1 and 9. Because of the construction of the flexible tube 156, which typically could be a lightweight plastic or metal the device is inherently "fail safe" so as to preclude the necessity of providing a scheme similar to that incorporated in the previously described embodiments. In this design the helical coil is wound around the center stem conserving axial length.

In another variation of this design, the coil itself is calibrated such that its axial movement is proportional to the air pressure within. This eliminates the need for spring 96, further simplifying the design.

Finally, a variation of the basic design of FIG. 1 is shown in FIGS. 12 and 13. The basic design of FIG. 1 is incorporated in this embodiment which is intended to be supplied as part of the original tire when delivered by the tire manufacturer or new car dealer. The main difference between the design of FIGS. 12 and 13, and those previously described, is the requirement that a coil spring 170 be disposed between the bushing 78 and the top side of disc like member 58. This sping, 170, in effect replaces or serves the same function as the spring formally found in the tire valve stem. Spring 170 exerts a sufficient upward pressure as viewed in FIG. 12 to maintain a sufficient seal between the gasket 76 and the knife edge 32 to prevent leakage from the gauge at that point.

As shown, the outside surface of outer wall 18 is bonded to a rubberized, tire valve structure 172 which is secured in the tire side wall 174 in a known manner. The tire would be inflated in the same manner as described earlier.

FIGS. 12 and 13 shows a modification of the design previously described which may be a desirable adaptation of the basic design. It includes the provisioning of a filler tube 176 which is bonded, in place in the vent hole 66. The filler tube 176 would be fabricated from copper or similar material which could be readily cut and then crimped or soldered to provide an airtight termination as shown in FIG. 13 and 178.

Employing this variation on the basic design, the gauge manufacturer would be able to preset a given lot of gauges for use at a particular pressure-the one most suitable for a given tire. A range of these type gauges would be provided which covered existing and anticipated recommended pressures as set by the tire manufacturers.

During the manufacturer of the gauge and after it is assembled, the gauge would be positioned on a suitable tire simulating device which could be inflated to the desired pressure for that gauge. Initially, piston 180 would be forced upward until the top thereof, 182, contacted the underside, 184, of the end cover. (Spring 186 in this application would not be the calibrated type disclosed earlier. Its main function in this application would be to insure that the piston 180 is thrust downward if the diaphragm ruptures to give an indication that the gauge has failed).

After inflating the tire simulating device, pressurized gas would be introduced into chamber 64 through filler tube 176. The gas in chamber 64 would exert a downward force on piston 180. The piston would move down and the pressure of the gas supplied through filler tube 176 would be varied until the piston assumed an intermediate axial position. The annular band 48, of course, would position itself in a corresponding axial position. A permanent annular, masking band 196 would then be painted on or otherwise permanently affixed to the outer surface of housing 198 at the same axial location as the band 48. The filler tube 176 would be crimped and/or soldered or sealed in some other suitable way to prevent the pressurized gas from escaping from chamber 64. The gauge could then be removed from the simulating device and prepared for delivery. The gauge just described would be delivered to tire suppliers or others whose job it is to mount tires. The gauge would be supplied with instructions which would note its particular operating pressure. The supplier would install the gauge-valve device in a tire whose recommended pressure would be that of the gauge. The tire would then be inflated until the annular band 48 positioned itself behind the masking band 196. At this point, the supplier would know that the tire is inflated at the correct pressure for that tire.

Subsequently, the motor vehicle operator could tell if the tire was not at the right pressure by noting that band 48 was no longer positioned at the same axial position as indicator band 196. He could then take the necessary corrective action in order to re-establish the proper operating pressure.

The approach just described as noted earlier eliminates the need for a calibrated spring and thus provides a less costlier gauge. Further, motor vehicle operators with no idea of the right pressure required by their tires need only know to align the bands 48 and 196 to achieve the proper pressure and thus insure proper operating conditions.

It is to be noted in the embodiment depicted in FIG. 12, that the previously described means for inflating the tire-bushing, shaft and flanges 78, 72 and 76 respectively, could be replaced by a standard valve stem which would be fitted in the disc like end 58 in a suitable fashion.

Referring now to FIGS. 14 thru 18, inclusive, there is shown another variation of the basic invention described herein, which requires that the operator of the gauge depress the body portion of the gauge in order to obtain a pressure reading.

FIG. 15 describes a preferred embodiment of such a gauge. It includes a first enclosure 200, formed between an inner housing 202 and an outer housing 204. The two housings are bonded together at annular seams 206 and 208 to form the annular cavity identified as the first enclosure 200.

The outer housing 204, is an inverted cylindrical cup made from a transparent material such as clear plastic. As viewed in FIG. 14, the exterior of the outer housing, 210, has embossed or imprinted thereon a range of numerals 212 corresponding to the range of pressures expected during the use of the gauge. As noted with respect to FIGS. 1 to 13, the range of pressures can be positioned at annular increments around the outer perimeter of the housing so that the gauge provides the operator with a 360° readout capability. Further, groups of serrations (not shown) may be interposed between each grouping of numerals to accomodate an "O-ring" indicating band (also, not shown, in the embodiment). The outer housing is cutout at point 214 to accomodate an annular ring portion 216 of the inner housing.

The inner housing, 202, includes a main, hollowed-out cylindrical portion 218. The housing includes a cup-shaped portion defined by annular sidewall 220. The sidewall terminates at the one end by flanged portion 222. At the opposite end of the inner housing is located the previously identified annular ridge 216. As noted earlier the main portion 218 is hollowed-out to form a cylindrical opening 224 which is threaded to accept other parts of the gauge as well as the standard tire valve. Thru holes 226 and 228 run through the main portion of the inner housing 218, transverse to the longitudinal axis of that member, near the annular ridge end. The circular flanged portion 222, includes an opening 230 which is best seen in FIG. 18. Although not discernible from FIG. 15, the outside wall 232 of the inner housing can have a slight taper to it, being inclined towards the longitudinal axis of the gauge in the downward direction as viewed in FIG. 15. This reduces frictional forces as the "O-ring" is deformed under increasing pressures.

A second enclosure, of variable volume is formed within the first enclosure 200. The second enclosure 234 (best seen in FIGS. 19 and 20) is formed by an "O-ring" 236, which is bonded to a piston-like, spacer member 238 by a suitable adhesive.

The "O-ring" is a standard catalog item having a thickness in the plane perpendicular to the longitudinal axis of the gauge, which is slightly larger than the radial thickness of the first enclosure at its widest point, which because of the taper mentioned earlier, would be at the bottom of the first enclosure 200, as viewed in FIG. 15. The "O-ring" exerts sufficient pressure on the walls defining the first enclosure such that the leakage of pressurized gas thereby is eliminated.

The piston-like member 238, is an annular ring of suitable material which has a first surface 240 of concave shape to which the "O-ring" is bonded. The axially opposite face or surface of the ring 242 is substantially transverse to the longitudinal axis of the first enclosure but includes an interrupted, annular ridge 244 which spaces the member 238 off from the inside surface 246 of the outer housing. As noted, the ridge 244 is interrupted at various locations around its circumference, such at points 248, 250, 252 and 254 in FIG. 17, to insure that the pressurized gas can contact the maximum area on the surface 242.

Although the "O-ring" and piston-like member are illustrated as separate pieces, to take advantage of the ready availability of standard sized "O-ring", it is understood that the piston-like member and "O-ring" can be molded from rubber or suitable elastomeric material and formed in one pieces with the profile shown in FIG. 15.

Located in the central portion of the gauge is the valve stem actuating mechanism which allows the operator to either take a reading of the pressure in the tire or to inflate same if so desired.

The gas releasing and inflating mechanism includes a cap portion 256, which includes a cylindrical cup portion 258 disposed axially from a flanged portion 260. Extending axially from the opposite side of the flanged portion 260 is threaded cylindrical portion 262 which has an outside diameter corresponding to the inside diameter of cylindrical opening 224 in the main portion 218 of the inner housing. On the inside wall of cylindrical cup portion 258, there is an annular groove 264. The annular groove 264 has a slanted lower edge 265 disposed axially inward from the upper end of the gauge. The cylindrical cup portion terminates at the uppermost axial end thereof, as viewed in FIG. 15, in a flanged portion 266 which slightly overhangs the cylindrical opening formed by the main portion of cup 258.

The flanged portion 260 of the cap 256 has an outside diameter (O.D.) equal to the O.D. of the outer housing 204. The under surface 270 of the flange can be bonded to the upper surface of the inner and outer housing by a suitable adhesive. This provides an additional airtight seal to eliminate a potential leakage path.

The threaded cylindrical portion or stem 262 is only threaded at the end thereof which meets with the threaded opening 224. The portion of the threaded stem 262 nearer the flange 260 has the threads removed. This provides an annular channel 272 which is contiguous with the openings 226 and 228. Further, the threaded stem 262 includes slots 274 and 276 running parallel to the longitudinal axis thereof which provide a channel for directing gas released from the inflatable device to the annular cutout 272 and thence, through the openings 226 and 228, into the second enclosure 234.

The valve actuator member 278 is a cylindrical member having a U-shaped profile with an axially extending pin member 280. At the axially upper portion of the actuator member, there is located a circular flange 282 having an O.D. substantially equal to the inner diameter of cup member 258. Located in the sidewall 284 are thru holes 286 and 288. These form part of the channel for directing gas into the inflatable device.

A hose contacting member 290 includes a cylindrical disc 292 and an axially extending, rod-like member 294 which makes contact with the valve stem in the air hose.

Positioned at the axial upper end of the gauge is a retainer cup 296 including a main cylindrical portion 298 having a cylindrical opening 300 at the center thereof opening into a larger cylindrical opening 302 defined by sidewall 304. The main portion 298 includes an annular groove 306 in which there is disposed a suitable "O-ring" 308. The main portion 298 of the retainer cup is appropriate diameter such that the flange 266 restricts the upward axial movement of the cup 296.

Interposed between the upper surface of the disc 292 and the under surface of main portion 298 is a sealing gasket 310 which has an inside diameter substantially equal to the diameter of rod member 294 and is thick enough in the horizontal plane, as viewed in FIG. 15, to seal off the cylindrical opening 300.

Positioned in the opening defined by sidewall 284 is a spring member 312 which contacts surface 314 of valve actuator member 278 on the one end and the surface 316 of disc member 292.

Surrounding the sidewall 284 is a second spring 318 which on the one end contacts the under surface of flange 282 and on the other end the top surface of a spanner nut 320.

The spanner nut has a threaded outside perimeter whose diameter is equivalent to that of the cylindrical opening 224.

The nut includes an interior opening 322 through which the pin member 280 passes in the assembled position. Notches 324 and 326 allow for the use of a spanner wrench in the assembly of the gauge.

Positioned in the first enclosure 200 is a third spring 328 which contacts the upper surface of flange 222 at the one end and at the other end, a retainer spacer 330, which is bonded to the "O-ring" 236, at the opposite end. This third spring is calibrated to control the movement of the piston-"O-ring"-retainer ring combination, in response to air pressure, such that the last mentioned combination settles at a position opposite the marking indicative of the pressure of the gas within the inflated device.

Although identified in the drawings as a separate piece, it is to be realized that the retainer ring 330, may be molded to together with the piston-"O-ring" combination mentioned earlier to form a one-piece unit.

Painted on the radially outward wall of the combination formed by member 238, "O-ring" 236 and the retainer spacer 330, would be a suitably colored annular ring 332 which, of course, moves with those combined pieces to position itself opposite the pressure indication in the range 212 to reflect the pressure of the gas in the inflated device. The "O-ring", 236, itself can provide the necessary indication without the need for an additional painted band.

Assembly

The gauge shown at FIG. 15 is assembled by first positioning the spring 328 around the main portion 218 of inner housing 302 and positioning above that, the "O-ring"-piston member-retainer ring combination 236-238-330. The first enclosure is then formed by cementing the outer housing 204 to the inner housing 202 at the seams 206 and 208.

The cap portion 256 is threaded into the circular opening 224 until the flange 260 contacts the top surface of the inner and outer housing. As noted earlier the under surface 270 can be bonded to the upper surface of the inner and outer housing if desired.

Next the retainer cup 296, with "O-ring" 308 in place, is inserted into the opening defined by cylindrical portion 258.

Then the hose contacting member 290, with gasket 310 in place is inserted through opening 300. The valve actuating member 278 with spring 312 positioned within the opening formed by sidewall 284 is inserted into the opening defined by sidewall 258. Spring 318 collars sidewall 284 and the spanner nut 320 is inserted into the opening 224.

The nut is threaded up into the opening until the bottom surface thereof, 334, is flush with the bottom surface 336 of pin member 280. The length of springs 312 and 318 are selected such that when, surfaces 334 and 336 are flush, spring 318 is exerting an upward force on flange 282 while spring 312 is exerting an upward force on disc 292.

Space between the end 338 of threaded stem 262 and the top surface of the spanner nut is provided to allow for adjustment of the spanner nut to compensate for that situation where the valve stem 340 is not flush with the top surface of the valve wall 342.

Operation

The gauge is threaded onto the valve wall 342. The disposition of the first enclosure relative to the threaded opening 262 and the valve is such that the second enclosure 234 increases in volume in the direction of the inflatable device as the pressure inside the device increases. This variation of the basic principles of the invention allows for a doubling back of the first enclosure thereby reducing the overall length of the gauge and thus, avoiding breaking the gauge by contact with the curb if in fact it is maintained in place on the tire valve.

Referring particularly to FIG. 19, there is shown the use of the gauge described in FIGS. 14 thru 18, as it is employed to read the pressure in a tire.

With the gauge in place on the valve wall 342, the operator places on of his fingers over the opening 302, depressing the retainer cup 296 by downward pressure of his finger. Since flange member 282 is kept in contact with the under surface of portion 298 of the retainer cup by spring 318, the valve actuator member 278 responds to the depressing force exerted by the operator and moves downward as well. Pin member 280 contacts the valve stem 340 forcing it downward also. After approximately 1/32 inches travel, air is released from the inflated device traveling upward therefrom in the direction of the arrows. Air first travels through opening 322, into the portion of cylindrical opening 224 immediately between the top surface of the spanner nut 320 and the surface 338 of the stem 262, and then upward through the slots 274 and 276 into the annular cutout 272. From there it travels into the second enclosure 234 via the circular openings 226 and 228. The force of the pressurized gas working on the surface 242 drives the piston-"O-ring"-retainer disc combination downward until the annular band 332 is positioned opposite the air pressure of the device.

Air is prevented from leaking out of the gauge during this operation, along paths 344 and 346 due to the sealing action of the "O-ring" 308 against the slanted lower edge, 268, of the annular groove 264 and by the sealing action of gasket 310, respectively.

When the operator removes his finger from the cup 296, the spring 318 having been compressed further by the action of the operator taking a reading, exerts a force upward as viewed in FIG. 19 on the flange 282 such that the retainer cup is restored to the at-rest position shown in FIG. 15. Air trapped in the enclosure 234 slowly leaks out therefrom by passing the flange 282 and the cylindrical wall 258 and out through the groove 264 and the space between the flange 266 and the sidewall 304.

The inflating operation can be best understood by referring to FIG. 20. This shows an air hose 348 connected to the gauge with the hose valve member 350 contacting the rod member 294 so as to drive it downward relative to the retainer cup member 296. By depressing the air hose contactor 290, the seal formed by gasket 310 over the opening 300 is broken. Air released from the hose 348 moves along the path of the arrows in FIG. 20 into the opening 302, down through the opening 300, into the opening 352 and then into the opening 354 by way of the thru holes 286 and 288.

The air continues downward through the opening 322 and then into the cavity defined by the valve wall 342.

Simultaneously the valve stem 340 has been depressed sufficiently by the contacting action of the air hose valve gasket 356 contacting the sidewall 304 of retainer cup 296. As explained with respect to FIG. 19, the downward force applied by the valve gasket 356 is transmitted through the retainer cup and the actuator member 278 to the valve stem. The sealing action formed by the cooperation between the "O-ring" 308 and the slanted lower edge 265 of the groove 264 prevents the entering air from exiting from the gauge. Also, as the air hose is pressed down onto the gauge, gasket 356 contacts the top surface 357 of flange 266. This provides an additional seal.

It is to be noted that in addition to inflating the tire, pressurized air entering from the air hose 348 is also directed into the enclosure 234 via the openings 226 and 228. This provides a continuous monitor of the tire pressure while it is being inflated.

Upon removal of the air hose from the guage, the restoring spring 318 forces the actuator member 278 upwards until the main portion 298 of the cup contacts flange 266 of the retainer cup 296. The "O-ring" 308 is then positioned in the annular groove 264. Pin number 280 moves upward so that its lower end 336 is again flush with the surface 324, whereupon the valve stem 340 closes. Air trapped in enclosure 234 leaks out of the gauge in the same manner as described with respect to FIG. 19.

Figure 21:
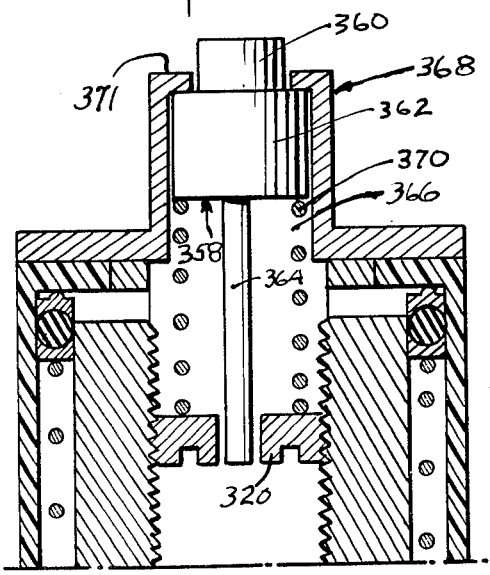

Referring now to FIG. 21, there is shown a gauge which is basically similar in all respect to that shown in FIG. 15 except that the means which coacts with the valve stem to either release pressurized gas from the tire or responds to device inflating means to thus inflate the tire is simplified. In this adaptation the retainer cup 296, actuator member 278 and hose contact 290 are replaced by a single actuating mechanism 358. The member 358 includes a hose contacting button 360 a main cylindrical portion 362 and a valve actuating pin 364.

The member 358 is positioned in cavity 366 formed by somewhat simplified cap portion 368.

The member 358 is captured in the cavity 366 and forced upward therein by the action of spring 370 interposed between the under surface of cylindrical portion 362 and the top of the spanner nut 320.

The operation of this embodiment with respect to taking a reading and, as well, inflating a tire is identical to that disclosed with respect to FIGS. 19 and 20. The main difference here is that the sealing action when taking a reading is performed by the operator's finger alone. Likewise, when used in the inflating mode, the only seal preventing escape of entering air from the gauge is the one formed by the air hose gasket 356 and the top surface 371 of the cap.

Figure 22:
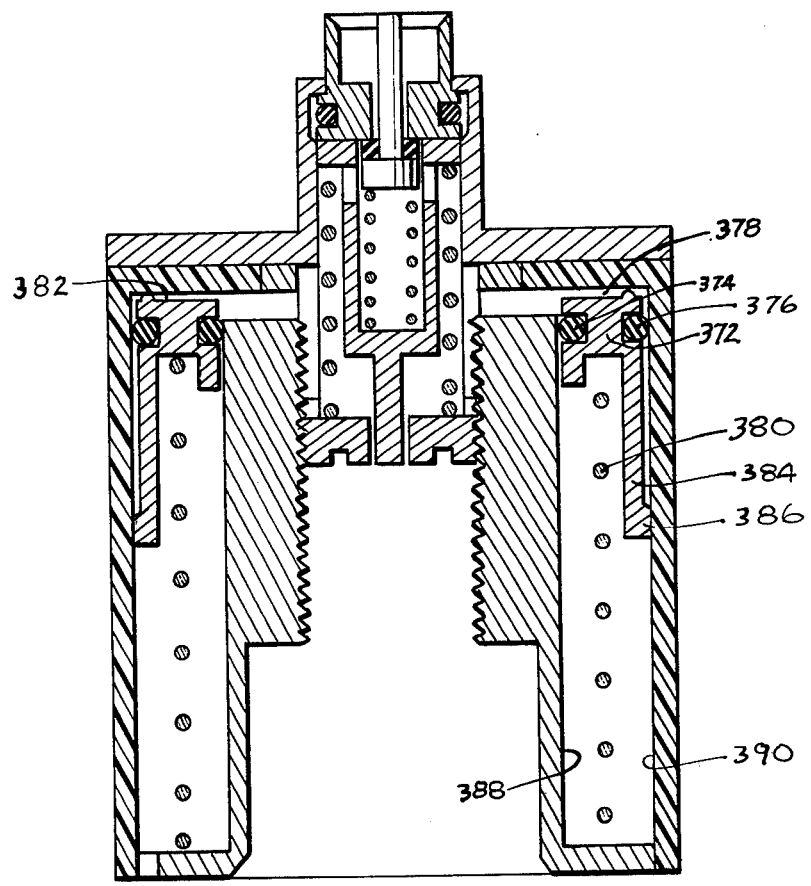

Referring now to FIG. 22 there is shown a variation of the means employed for forming the variable volume enclosure. Again, the details of the construction of the remainder of the gauge are substantially identical to those associated with the gauge of FIG. 15 or 21. Here, the means forming the variable volume enclosure comprise an annular piston-like member 372 which has embeded in its radially inward and outward walls, "O-rings" 374 and 376 of suitable diameter. As air enters the chamber 378 in either the pressure reading or inflating mode, the piston 372 travels within the volume 378 until there is equilibrium between the force exerted by the calibrated spring 380 and the pressurized gas working on the surface 382 of the piston. An extension art 384 running axially along a part of the length of the gauge includes a flanged portion 386. On the radially outward wall of the flanged portion 386 is painted a suitable annular band which would locate itself opposite the particular number on the pressure range located on the outer housing, corresponding to the pressure of the gas in the inflated device. Of course, the presence of the arm 384 is not necessary to the operation of the particular embodiment illustrated, and it is obvious that the "O-ring" 376 itself could perform the necessary indication given a properly calibrated spring 380.

The walls 388 and 390 are again tapered relative to each other such that they move away from each other towards the bottom of the gauge as viewed in FIG. 22.

Figure 23:
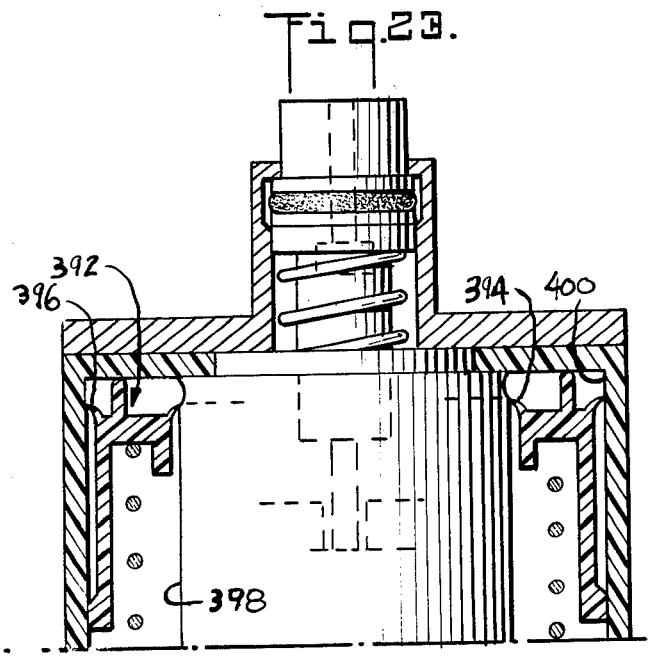

Referring to FIG. 23, there is shown yet another embodiment of the gauge which employs yet another means for forming the enclosure of variable volume. The remainder of the gauge is identical to either the embodiment of FIG. 15 or FIG. 21. Here, the "piston" member 392 is a cup shaped, annular member, which has flexibly inner and outer edges 394 and 396. The edges 394 and 396 are designed so as to be biased against the walls 398 and 400 respectively, effecting the necessary seal to prevent air leakage around the member 392. Again, the operation of the gauge in both the reading and inflating modes is identical to that previously described with respect to FIGS. 19 and 20.

Of course, modifications to the various embodiments described above can be made by those skilled in the art. One such modification would be an elongated version of the above described gauge having a more extensive pressure range. This could replace today's gauge used by gas station attendants. It would be screwed onto the tire valve stem when the car is driven into the station, the pressure checked and the tire inflated or deflated while the gauge was in place.

Further, where two or more pieces have been identified, such as the inner and outer housing of FIGS. 14 to 23, as forming various portions of the gauges described, the combined piece can be molded as a single piece and obvious variations in the details of the embodiment made to accomodate the molded piece.

Referring now to FIGS. 24 through 35, there is shown yet another embodiment of the present invention. In this embodiment, gauge, 402, is designed to utilize standard valve cores which have been proved through many years of successful use, thus avoiding the need to design a valve core compatible with the earlier described embodiment. The gauge shown in FIGS. 24 through 35 also employ an interconnecting arrangement between the standard valve core and the end of the gauge which interfaces with the air pump, which arrangement enables the gas station attendant to utilize presently available valve core removal and insertion tools. He is thus able to follow the procedures he presently employs to change or repair a flat tire without the need of any special tooling.

The embodiment to be described employs the doubling back feature of the gauge depicted in FIGS. 15–23. However, the present embodiment is mounted as an integral part of the rim and tire assembly (like the embodiment of FIGS. 12 and 13) with the attendant advantages of that arrangement.

One variation of the present embodiment includes a stem portion which is adapted to accept a plurality of spacer washers to achieve a sufficient distancing from the rim to allow the indicating portion of the gauge to be positioned outward of the wheel cover for easy viewing. The stem includes a threaded end portion for mounting the gauge to the wheel rim. By moving the spacers from one side of the rim to the other, variations in the distance the gauge protrudes beyond the wheel cover can be achieved, thus accomodating various wheel designs.

The second variation of the present embodiment has the stem portion of the gauge embedded in a standard rubber mounting member which is pressed into the rim much like today's valve stem arrangements. This affords a fixed spacing for the gauge and it is most suitable for particular wheel designs.

The gauge of this embodiment lends itself to being bent at the stem portion to allow the upper part of the gauge to fold into the profile of the wheel eliminating curb interference problems.

The present embodiment also employs improved indicating means resulting in more accurate readings by the user.

Referring now particularly to FIG. 24 there is shown one variation of the present embodiment, 402, which includes an inflating and reading activating end 404, contoured as in the earlier embodiment, to interface with standard air pump equipment and to facilitate pressure reading by allowing use of the operator's finger to obtain a pressure reading.

The indicating portion of the gauge, 406, is disposed in the mid portion of the gauge while the mounting thereof is effected by the spacer and nut arrangement shown at 408.

The indicating means 406 can include the number indicia reflecting the pressure range of the particular gauge and serrations disposed about the perimeter of the gauge for purposes of securing an O-ring at a desired pressure level. However, since the main purpose of this embodiment is to be used as factory installed equipment or, at least, with particular tire assemblies, more often than not, the pressure for that tire will be constant and set at a particular psi. Thus, a pointed ring, 410, would be positioned on the indicating portion of the housing at a precalibrated pressure level. This ring would work in conjunction with an indicator band 412, internal to the outer housing, which would move in response to actuation of the pressure reading mechanism, 404. The indicator band, 412, axially aligns itself with the painted band, 410 when the tire is properly inflated.

Mounting means, 408, for securing the gauge to rim, 414, includes a plurality of spacer washers, 416, which are interposed between a shoulder on the upper portion of the gauge and the rim. The gauge with the spacers on the mounting stem thereof is placed in the accomodating hole in the tire rim and a sealing ring, 418, and back up washer, 420, placed on the stem and drawn up tightly to the rim by the double locking nut arrangement, 422, and 424.

The plurality of spacer washers, 416, space the upper portion of the gauge from the rim so that the distance, 426, between the rim and the wheel cover, 428, is sufficient to enable ready viewing of the gauge. The spacing, 430, is a function of the number of spacer washers employed and will vary depending on the particular wheel design.

432 shows the wheel rim in phantom for that arrangement when the wheel cover, 428, is somewhat closer than that just described. Here the sealing ring, 434, is behind the rim with the spacers, 416, (although not shown in phantom) positioned on the gauge stem between the backup washer, 436, and the two nuts, 422 and 424.

For a particular stem length, all of the spacer washers, 416, must be employed, together with the sealing rim, backup washer and double locking nut arrangement in order that the end of the stem 438 is flush with the exposed surface of the nut, 424.

In a typical design, the spacers can provide 0.700 inches of adjustment in the length of the gauge protruding outward from the tire rim. By placing combinations of the spacers on either side of the rim the position of the gauge outward from the tire assembly can be varied accordingly.

The mid portion of the gauge is preferably covered by rubber sleeve, 440, eliminating "chatter" which might otherwise occur with the banging of the gauge body against the wheel cover, 428.

Referring now to FIG. 25 there is shown a cutaway, sectional view of this embodiment of the pressure gauge.

The gauge is seen to comprise an inner housing member 442 which includes a first centrally disposed cavity 444 extending a substantial part of the length of the gauge through the stem thereof at one end so as to be able to communicate with the inside of the tire. On the other end of cavity 444 is a second cavity 446 which is threaded in part and contoured to accept a standard valve core assembly. The inner housing further includes a third cavity 448 in which is disposed the inflating and pressure reading connecting assembly 404.

Through the wall of the inner housing surrounding the third cavity 448 there is provided at least one radially extending thru hole 450.

The outside of the upper portion of the inner housing wall defining the third cavity can be threaded as shown at 452 in order to accept a valve stem cap for purposes of protecting the inner workings of the gauge from the elements and as a "seal" against any leakage which might result if the core assembly malfunctioned.

The outside circular wall 454 of the inner housing is a tightly toleranced surface for purposes of the invention. The surface 454 extends a substantial part of the length of the inner housing terminating in a first annular ledge 456 which extends radially a distance until it is terminated by a second circular wall 458 having a diameter which is substantially concentric with the diameter of the first wall 454. The second outer wall 458 extends an additional axial length until terminated in a second annular ledge 460. The latter terminates in an outer wall, 462, of the inner housing.

The inner housing extends further to form a rim mounting portion 466 which has a smooth section 468 extending a distance comparable to that taken up by the spacer washers 416 and the sealing ring and back up washer, 418 and 420. This insures an optimum seal by the sealing ring 418 and the mounting stem of the gauge to avoid leakage therebetween. The mounting portion 466 terminates in a threaded section 470 for receiving the double nut arrangement 422 and 424 which cooperate to secure the gauge to the tire rim.

The indicating means for this embodiment is shown at 474. It comprises an annular collar 476 which has an inside diameter substantially equal to the diameter of the surface 454 of the inner housing. The collar includes an annular groove 478 which has a painted band 480 on the radially inward surface thereof.

The indicating means further includes a cylindrically shaped extension arm 482 which terminates in an annular flange section 484.

Positioned on the top surface 485 of the collar 476 is an annular, channel shaped portion 486 which may be formed as an integral portion of the indicating means member 474 or be a separate piece which is cemented to the top surface thereof.

The reason for the cylindrically shaped indicating means having a flanged end section 484, is to eliminate the tendency for such a configuration to cock due to the unsymmetrical force exerted on the under surface 487 of the annular collar 476 by the top coil 488 of the spring 472. The flange section is designed such that it will contact the inner wall of the outer housing before any significant tilting of the collar portion can take place. The length of the extended arm 482 takes into consideration the amount of tilt that might be expected due to this unsymmetrical force and the clearances and manufacturing tolerances of the involved pieces so as to eliminate any significant tilting. This design feature also eliminates scoring of the inside surface of the outer housing by the annular collar 476. This insures continued visibility of the band 480 over the life of the gauge.

Positioned in the channel 486 is a V-shaped seal 490. Its mating surface with the channel is shaped and contoured to adapt thereto readily. The open portion of the V-shape is directed away from the channel.

Surrounding the inner housing, the calibrated spring, and the indicating means, is an outer housing member 492. It includes an annular collar 494 which has an inner diameter substantially equal to the diameter of the outer wall 454. Extending axially downward from the collar as viewed in FIG. 25 is an annular protrusion 496 which includes at least one radially extending thru hole 498 or slit cut into the protrusion. The hole 498 communicates with the thru holes 450 via the annular cavity, 499. The protrusion at 496 includes an annular ridge portion 500 which stabilizes the seal 490 in the at-rest position to thus eliminate binding of the seal against the mating surfaces of the inner and outer housing.

The housing further includes a cylindrical wall 502 which extends a substantial part of the gauge, resting on ledge 460. The inside surface 504 of the wall is likewise a tightly toleranced surface and is concentric with the surface 454 of the inner housing - in a typical situation to within a .001 inches. Radial hole 505 is drilled thru the wall 502 and sleeve 440 to reduce the back pressure behind the indicating means during operation.

A collar ring 506 is threaded on to the upper end of the inner housing and cemented to the top surface of the collar 494 of the outer housing to keep the assembly intact and airtight.

Referring now to FIGS. 26, 27 and 28, there follows a detailed discussion of the assembly and interconnection of the standard valve core assembly 508 and the inflating-pressure reading interconnecting assembly 404.

The inflating and pressure reading interconnecting assembly, 404, comprises an extension shaft 510 which includes a cap portion 512 connected to a cylindrical portion 514. The latter is joined to a square or rectangular section 516 which terminates in a cylindrical cup portion 518.

The cap portion of the shaft includes an arcuate section 520 including, as is seen in FIG. 27, flattened surfaces 522 and 524 which facilitate use of a standard valve core removal tool to extract the interconnecting assembly from the gauge. The cap, 512, further includes a cylindrical disk portion 526 which is disposed between the arcuate section 512 and the cylindrical portion of the shaft 514.

A bleeder hole arrangement including hole 528 along the longitudinal axis of the shaft 514 and a hole 530 transverse thereto are drilled in the shaft and connect the top of the arcuate section with the cavity 532 surrounding the shaft 514.

The end, 534, of the cylindrical cup section 518 is rolled over the raised portion 535 of the valve stem 536. This makes the extension shaft an integral part of the valve core assembly.

The interconnecting assembly 404 further comprises a coupling collar 538, which locks the extension shaft 514 to the valve core assembly, to enable the integral unit to turn as if it were one assembly. The collar in the embodiment described is basically cylindrically shaped with appropriately contoured cutouts which fit over coacting portions of the shaft extension and valve core assembly. E.G., the upper portion 540 of the collar is either square or rectangle or can be keyed, whatever is appropriate, to be compatible with the corresponding portion 516 of the shaft. The lower portion of the collar, includes a cutout 542 which bridges the flats, 544 and 546, of the standard valve core assembly, normally used with an appropriate tool to remove that assembly from the tire.

Thus it can be seen that the collar 538, locked by the upper cutout 540 to the extension shaft and to the valve assembly 508 by the cutout 542, provides for unison movement of the shaft extension and valve core assembly when rotated. Thus by connecting a standard valve removal tool to the flats 522 and 524 of the cap 512 and rotating same, this rotational movement is transmitted via the shaft 514 to the standard core assembly 508 thus enabling its removal from the gauge. This embodiment is thus seen to utilize tools that are presently readily available and not of special design.

While the standard core assembly outlined is seen to be the type where the sealing spring is internal to the core body, it should be apparent that this embodiment is readily adapted to utilize that type of core assembly where the sealing spring is external to the valve body.

The interconnecting assembly 404 further includes a butterfly valve 548 which has an O.D. somewhat larger than the I.D. of the inner surface 550 of the inner housing and an inside diameter substantially equal to the O.D. of the cylindrical portion 514 of the shaft 510. The valve 548 is made of an elastomeric material which can withstand air pressures during the tire filling operation in excess of the pressure range of the gauge so that it is able to allow for the passage of air into the tire but prevent the leakage of air thereby during the reading mode.

The assembly 404 further includes a backup washer 552 which holds the butterfly valve 548 against the disk portion 526 of the cap through the force of spring 554. The latter spring has an I.D. approximately equal to the diameter of the cylindrical portion 514. The spring sits on the top of collar 538 and is biased against the flat washer 552 in the atrest mode. The spring through its exertion of an axially directed upward force on the shaft, provides a positive force on the valve stem 536 insuring that it is maintained in a closed position. It also thrusts the butterfly valve upward to provide a tighter seal at the extremities thereof with the surface 550. This inherently forces the operator to place his finger over the bleeder hole 528 and to exert sufficient force, when taking a reading as to insure sealing thereof.

To assemble the interconnecting assembly 404 with the standard valve assembly 508 before insertion into the gauge unit, the valve 548 and flat washer 552 are first placed over the shaft 514. The spring and coupling collar are then set in place with the coupling collar forced up the shaft (as viewed in FIG. 26) until the bottom thereof clears the cup 518. The end of the cup 534 is then rolled over the ridge 535 thus making the two pieces integral, whereupon the collar is released.

Figure 29:
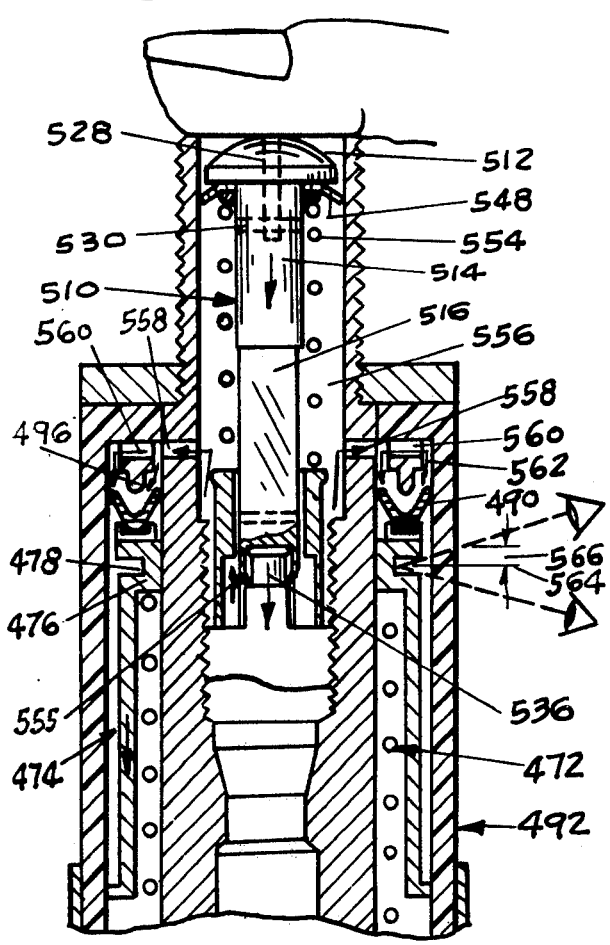
Figure 30:
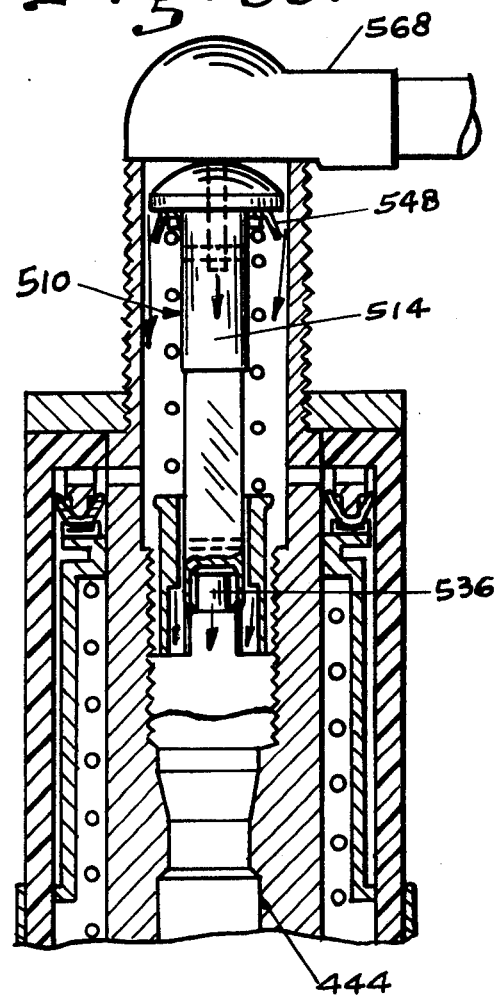

Referring now to FIGS. 29 and 30, what follows is a description of the reading and filling operations employing the embodiment of the gauge presently under discussion. Referring initially to FIG. 29, the user in attempting to determine the tire pressure places a finger on the top of the gauge housing covering the hole 528 and forcing the shaft 514 downward. The bottom of portion 516 of the shaft moving axially contacts the valve stem 536, depressing it into the core assembly thus releasing the air from the tire. The released air follows the path of the arrows 555, initially upward in the first channel 556 then transverse to that channel through a second channel formed by the radially disposed holes 558 and 560. The released air passes into the enclosures on either side of the axially extending protrusion 496 and exerts itself symetrically on the upper surface of the seal 490. The resulting force on the seal drives the extremities thereof against the mating walls of the inner and outer housing and forces the indicating means 474 downward. The calibrated spring 472 resists this motion and when its displacement results in a force equal to that exerted by the air pressure, the indicating means assumes an equilibrium position.

At that point, the painted band in groove 478 is disposed opposite the appropriate indicia on the outside of the outer housing 492 corresponding to the pressure within the tire.

The groove 478 is cut deeply enough into annular collar 476 so that user must view the band in the groove almost perpendicular therreto. Thus the distance 566 between the actual psi reading and the apparent "psi reading" is minimized to reduce the parallax error in gauge reading.

During the reading operation, while the finger is still in place on top of the gauge, the released pressurized air is prohibited from venting from the gauge via holes 530 and 528. Also, the released air cannot escape past the butterfly valve 548 because of its inherent resistance to the forces exerted by the pressures anticipated within a tire for a given gauge application.

After the reading the finger is removed and the shaft 514 is returned to the atrest position by the force exerted by the spring 554 and the spring in the core assembly. Valve stem 536 closes prohibiting further release of the pressurized air. The air trapped in the channels 556, 558 and 560 as well as the enclosure of varying volume above the seal 490 is bled off from the gauge through the holes 530 and 528.

FIG. 30 depicts the filling operation. The air pump nozzle 568 is placed over the gauge as is normally done with present valve core assemblies. The pressure of the air in the pump, is sufficient to force the perimeter of the butterfly valve 548 downward allowing for the entry of the pressurized air into the gauge. For a typical design, this pressure requirement might be in the vicinity of 40 psi or greater.

The nozzle 568 contacts the button portion of the stem 510 forcing the shaft downward such that it depresses the valve stem 536. The pressurized air from the pump proceeds down the channel 556 into the core assembly 508 and into the cavity 444 whereupon it enters the tire. When the tire is at the anticipated pressurized level, the nozzle can be removed and the actual pressure checked according to the procedure set forth with respect to FIG. 29. If more air is needed the nozzle can be replaced in position or, if in the first instance too great a pressure had been applied, the air can be released by successively depressing the interconnecting assembly allowing the air to vent through the bleeder holes 530 and 528.

Referring now to FIG. 31 there is shown an alternate sealing arrangement to use in lieu of the butterfly valve just described. The sealing valve assembly 570 comprises a modified cap portion 572 including an extended disk portion 574 having an annular groove 576 cut therein. Positioned in the groove is an O-ring of appropriate elastomeric material.

The inner housing 442 is modified from that described in FIG. 25 so as to now include a cutaway portion 582.

The distance between the location of the O-ring and the top of the cutaway portion is such that when the stem 584 is depressed for purposes of taking a reading, the O-ring does not reach the cutaway portion 582. This prevents leakage of the released air past the stem and insures that it is directed into the area of the seal 490 which reacts as described with respect to FIG. 29. However, when the tire is being filled the air pump nozzle depresses the stem 584 deeper into the body of the gauge such that the O-ring now is disposed in the cutaway area 582. The dimensions of the O-ring are such with respect to the diameter of the cutaway section 582, that the pressurized air from the air pump nozzle can pass therebetween and thus fill the tire.

FIG. 31 also depicts an adaptation of the presently described embodiment of the invention which allows for its utilization as a gauge to be screwed on to a standard valve stem already in place in a tire.

Referring now to FIG. 32 there is shown an alternate to the "V" shaped seal 490, described in FIG. 25. The annular ring seal 586 comprises a central portion 588 which is substantially rectangle in profile but includes a groove cut therein at 590 which mates with the annular ridge 500 of the axially extended protrusion 496.

The annular ring 586 further includes angled wing sections 592 and 594 which extend radially outward and inward, respectively, from the rectangular portion 588 to provide a seal against the corresponding surfaces of the inner and outer housing. When the gauge employing the type seal shown in FIG. 32 is activated for purposes of obtaining a reading, the released gas enters the enclosures 596 and 598 as with the "V" seal so as to exert an equal force on each of the two annular wing sections. This insures that a symmetrical force is exerted on each of these sections so that there isn't a "sticking" of the seal to one surface or the other due to an unbalanced force.

The seal may be bonded or cemented to the annular collar 476 of the indicating means although this is not necessary, and drives the latter downward in response to the force in the identical manner described with respect to the "V" seal.

The dimensions of the seal, particularly the annular wing sections and the material thereof are selected to provide an adequate seal against a blow-by of the pressurized gas but, at the same time, afford a minimum resistance to the force exerted by that gas in order that the seal not hang up.

FIG. 33 shows an adaptation of the gauge of the presently described embodiment which employs two painted bands 600 and 602 on the outer surface of the outer housing. This accommodates a typical situation found with respect to the pressure differential between tires located on the front wheels and tires located on rear wheels. Original equipment manufacturers can use this simple technique to preset the tire pressures for the front and rear tires for a particular tire size and vehicle. The tires to be used on the front of the vehicle would be pressurized until the indicator band 604 aligns itself with the upper band as viewed in FIG. 31 — representing the recommended tire pressure for front tires. The same would be done with respect to the rear tires except that now the tires would be pressurized until the band 604 lined up behind the painted band 600 set at the recommended pressure for the rear tires.

Thereafter, in use, an operator would only have to check the pressures in each of the tires to make sure that the band 604 was aligned behind either one of the two painted bands 600 or 602 — depending on whether it was the front or rear tires. This convenience would eliminate the operator's need to refer to an owner's manual or the like to check the recommended pressure.

Figure 34:
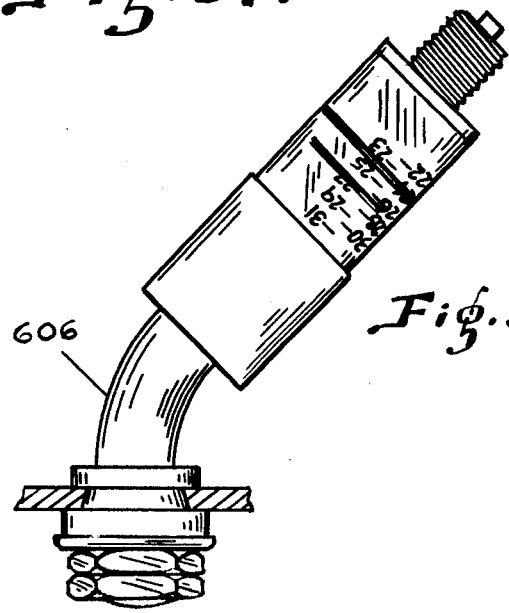

FIG. 34 depicts a modification of the present embodiment where the mounting stem 606 is bent to accommodate those applications where an upright adaptation for the gauge might result in curb clearance problems. The bent stem folds the gauge body into the profile of the wheel thus avoiding these problems. Since only the stem is bent, the operation of the gauge is unimpeded and is identical to that described above.

Figure 35:
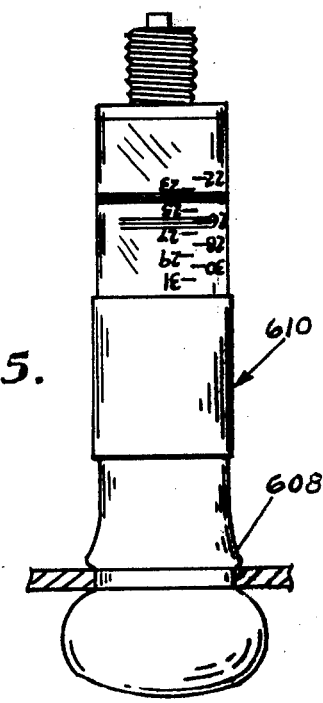

FIG. 35 depicts yet another adaptation of the basic gauge design of this embodiment wherein the method for mounting the gauge body to the rim employs a standard valve seat 608 which is cemented or otherwise affixed to the gauge body 610. This is a suitable means for securing the gauge to the rim in those circumstances where the wheel design is fixed and there is no need for the mounting adjustment feature described above. This is most appropriate again as part of the original supplied equipment for a car where the design and profile of the wheel is known and can be accommodated.

Figure 36:
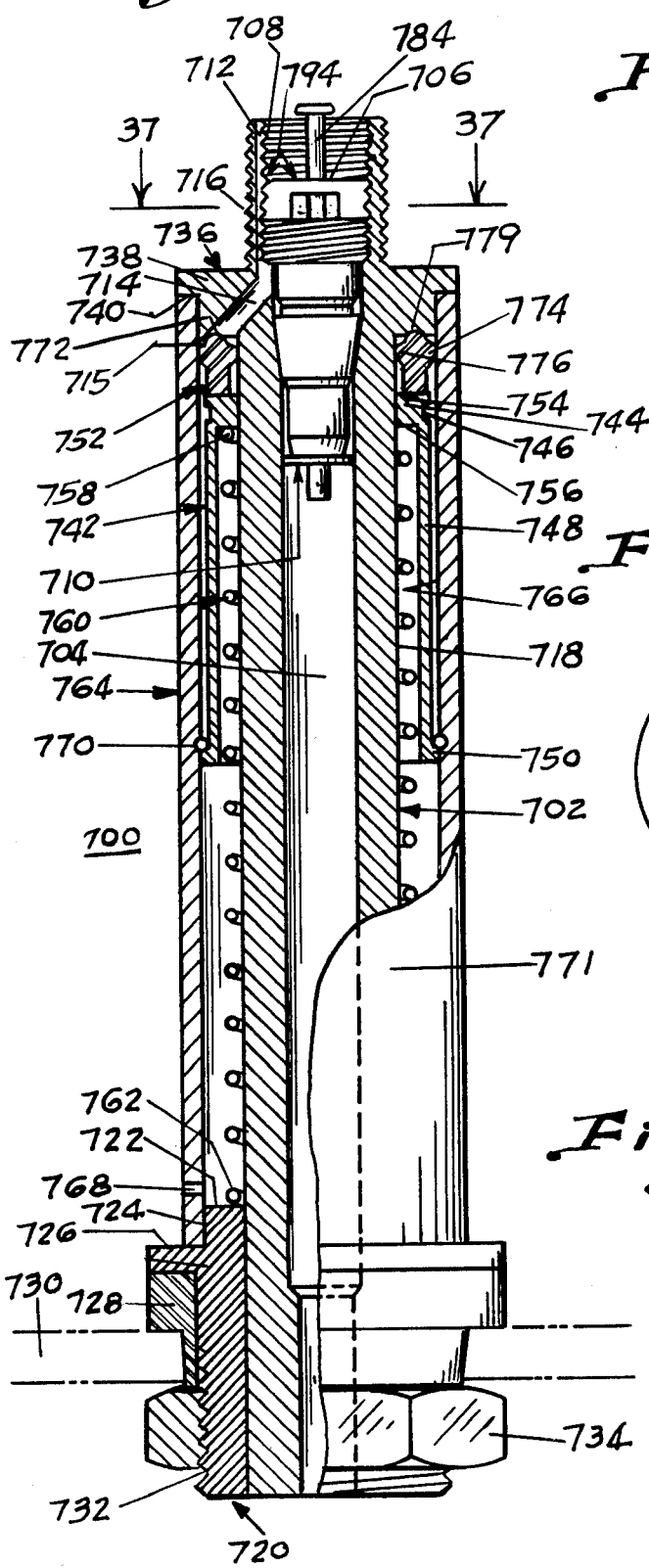

Referring now to FIG. 36, there is shown still another embodiment of the present invention. The version of the invention depicted, as with the previous embodiment, utilizes standard valve cores but is a somewhat simpler and less complex version.

It, too, employes the doubling back feature of the embodiment shown in 15, but like the embodiment shown in FIGS. 24 through 25, it is mounted as an integral part of the rim and tire assembly either employing the threaded stem-nut connecting arrangement or the molded rubber adaptation.

It is readily seen from the drawings and the accompanying discussion that practically all of the modifications and variations described with respect to the earlier embodiments are likewise applicable to this adaptation as well.

The design shown in FIG. 36, gauge 700, includes an inner housing member 702 having a first centrally disposed cavity 704 communicating axially with a second cavity 706 which is threaded and contoured, as at 708, to accept a standard core unit (see FIG. 28), such as 710.

Figure 37:
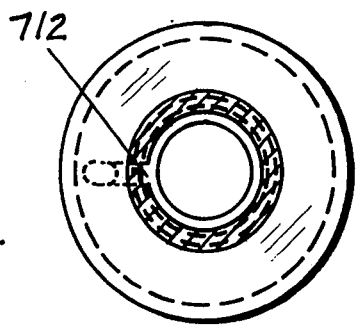

Cut into the inside threaded wall of the second cavity 706, is an axially extending cutout 712. This is better seen from the plan view in FIG. 37. This runs parallel to the longitudinal axis of the gauge and provides a passageway whereby the cavity 706 is able to communicate with an angled thru hole, 714, which in turn communicates with the enclosure 715.

As before, the ouside wall of the second cavity is threaded as at 716 to accept a standard valve cap or the dual purpose cap to be described hereinafter.

The outside circular wall 718 of the inner housing extends a substantial length. At the tire end, an end piece 720 is press fitted thereon. The latter includes a first annular ledge 722 which is terminated by circular wall 724. Typically, the circular wall 724 is concentric to within 0.001 inches of the surface 718 of the inner housing. The circular wall 724 extends from the ledge 722 to a second annular ledge 726 which provides a flange surface against which abuts grommet 728 which is interposed before the flange and the tire rim, 730, and the threaded end, 732, of end piece 720. Nut 734 is used to secure the unit to the rim.

The upper end, 736, of the inner housing includes an annular collar, 738. This provides a ledge 740.

Indicating means, 742, is similar to the design previously described with respect to the embodiment in FIGS. 24 and following. It includes an annular collar 744 having an annular groove 746 with suitable painting or other marking disposed therein. Although not shown as pronounced as in FIG. 25, it is understood, of course, that the groove 746 may be cut as deeply as the earlier described embodiment.

The indicating means further includes a cylindrically shaped extension arm 748 connected to the annular collar 744 and directed longitudinally towards the tire. This extension terminates in an annular flange section 750.

Disposed on the top side of the annular collar 744 is an annular elastomeric seal 752 which is cemented or otherwise secured to the top surface 754 of the collar 744. Biased against the undersurface 756 of the collar, is the top coil 758 of calibrated spring 760. The bottom coil of the latter, 762, rests on the ledge 722.

A cylindrically shaped, clear plastic housing, 764, forms the outer housing member and is disposed between the ledge 740 of the inner housing member and the ledge, 726, associated with the end piece 720. The housing is bonded to the ledge at 740 to provide an airtight seal. The inside surface 766 of this outer housing member is relatively tight toleranced and typically, concentric with the surface 718, again, to within 0.001 inches. Further, for purposes described with respect to the earlier embodiments, the cylindrical wall includes a vent hold 768.

Because of the manner in which air is introduced into the expanding enclosure, and the particulars with respect to the design of the elastomeric seal 752, it, typically, will require means for keeping the seal from closing off the thru hole 714. This is accomplished with the use of a snap ring 770 disposed in an appropriate groove in the inside wall 766 of the outer housing member. The ring limits the upward movement of the indicating means so as to prevent the constant spring force exerted by spring 760 from deforming and causing cold flow of the seal, 752, which, otherwise, would cause a wedging effect making the gauge inoperative.

As before, the gauge of the present embodiment can inclue an "anti-rattle" protective covering 771 to eliminate noise between the gauge and the wheel cover.

Figure 38:
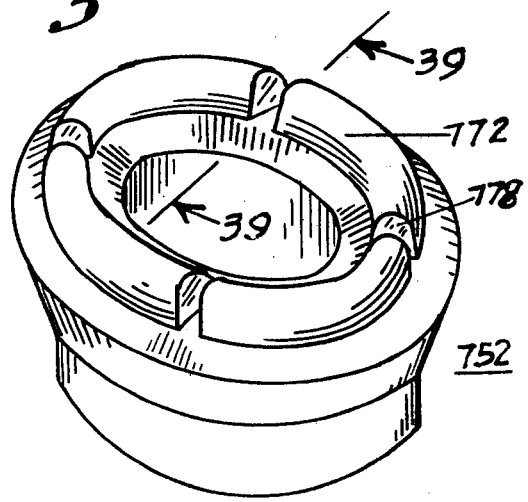
Figure 39:
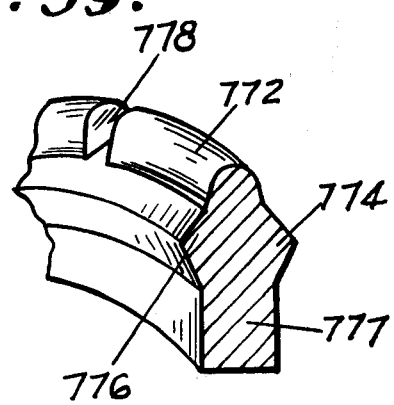

Referring now to FIGS. 38 and 39, there is shown an elastomeric seal which is considered to be of suitable design for this embodiment. It includes a semi-circular ridge 772 which extends to angled wing sections 774 and 776. The latter are then juxtaposed to the relatively rectangular section 777. The seal rests on surface 754 of the collar 744 and may be cemented thereto if found necessary.

The ridge section 772 of the seal includes a plurality of slits 778 which affords appropriate passageways for the air entering the enclosure 715 to contact and coact with the winged sections 774 and 776. This allows for a balanced force to be exerted by the air entering the enclosure on the seal, which in turn, minimizes the cocking of the indicating means.

The ridge 772 rests in groove 779 when the gauge is not being used. The durometer of the elastomeric seal 752 is chosen so as to avoid a closing down of the air passageways. This, plus the effect of the snap ring 770, allows for the air to pass to either side of the ridge when the indicating means is in the at-rest position.

Figures 40, 41:
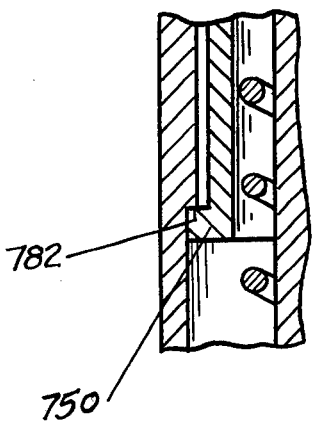

Referring to FIGS. 40 and 41, alternatives to the snap ring approach of FIG. 36 are shown. In FIG. 40 an annular ridge 780 is molded on to the inside wall 766 of the outer housing member 764. This ridge engages the flange 750 and provides the necessary effect to keep the ridge portion 772 of the seal from closing off the thru hole 714. In FIG. 41, a ledge, 782, is molded in the inside wall which coacts with the flange 750 to achieve the same end.

Figure 42:
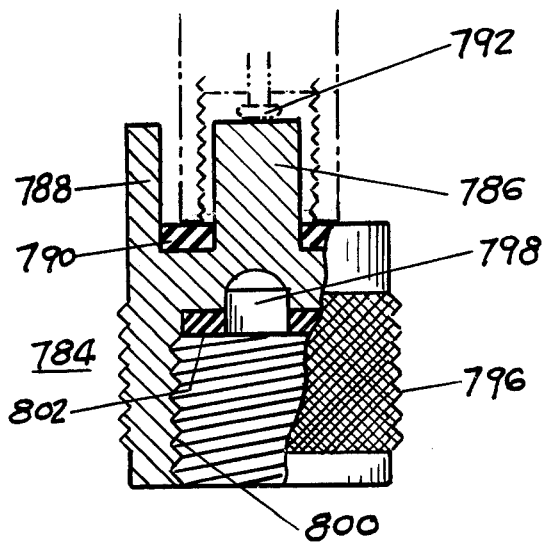
Figure 44:
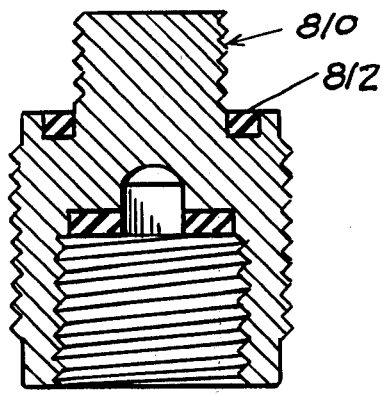
Figure 43:
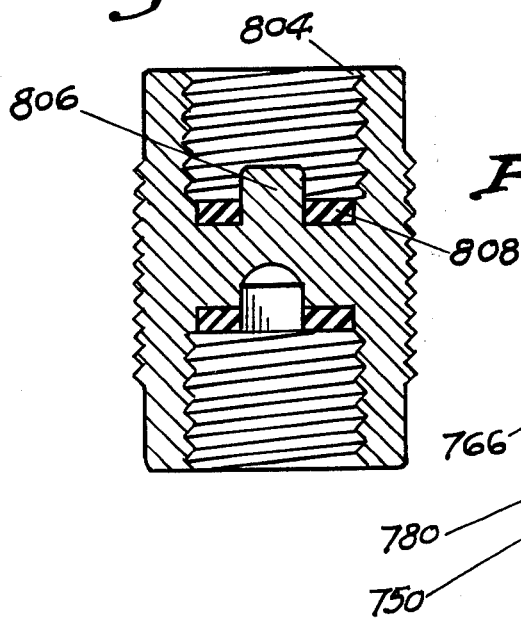

FIGS. 42, 43 and 44 depict various cap designs with provide a normal closure for the gauge and which include on their opposite end, a means for actuating the valve in the embodiment shown in FIG. 36, to thus allow the taking of a pressure reading. The cap to be described would also have application to the embodiments shown in FIGS. 14 through 22.

Particularly referring to FIG. 42, the cap 784 includes a centerpost portion, 786, and a circular side wall portion 788. These define an annular cavity into which is placed a gasket 790. The width of the cavity is such that the cap may be placed over the end of the gauge just described without there being significant lateral movement. This insures that the centerpost 786 will contact the actuated portion 792 of the valve core assembly. The gasket 790 is disposed in the cavity and cooperates with the end of the gauge to seal that point to thus prevent the escape of air when the reading is being taken.

When the cap is employed to take a reading, air flows out of the tire, up through the standard core assembly 710 and into enclosure 715 via the cutout 712, and angled thru hole 714. The direction of air flow is shown by the arrow 794, in FIG. 36. The air entering the enclosure 715, is directed onto the winged sections, 774 and 776, of the seal and exerts a force thereon to drive the indicating means downward until the painted groove 746 aligns itself with the corresponding pressure marking.

The cap further includes a knurled section 796 for ease of removal. The internal portion of the cap which is normally disposed on the end of the gauge includes a cutout section 798 of appropriate design so as not to actuate the end 792 of the valve stem in the at-rest position. The internal portion of that end of the cap is threaded at 800 so it may be screwed on to the gauge. It may further include a gasket 802 to eliminate leakage.

FIG. 43 shows another adaptation of the dual function cap where the portion which interfaces with the gauge during the pressure reading mode includes a threaded inner wall 804 which screws on to the end of the gauge until centerpost 806 contacts the valve actuator. Again, gasket 808 seals the end of the gauge to prevent leakage. FIG. 44 shows a threaded centerpost 810 which screws into the gauge until the gasket 812 seals off the end.

Although the various caps shown are metal and employ gaskets to seal the gauge, it is understood that the cap can be made from a suitable elastomeric material which provides the means for sealing in and of itself.

The gauge depicted in FIG. 36 is a lighter weight adaptation of the present invention which has less of an impact on the balance of the tire and results in less stress on the rubberized mounting when such is used to secure the gauge to the tire rim. Further, the adaptation just described is smaller in diameter which enables it to be utilized with standard wheel covers.

Other variations of the specific constructions disclosed will be apparent to those skilled in the art and must be considered to be within the breadth of the invention as defined in the appended claims.

What is claimed is:

1. A gauge for measuring the pressure of an inflatable device having a valve stem which comprises:
   (a) means for forming a first enclosure;
   (b) means for forming an airtight enclosure of variable volume within said first enclosure;
   (c) means for affixing said gauage to the valve stem;
   (d) means for coacting with the valve stem to release the pressurized gas within the inflatable device into said airtight enclosure, said releasing means also adapted to respond to device inflating means to thereby cause the device to be inflated;
   (e) means for controlling the variation of the volume of said airtight enclosure such that said variation is proportional to the pressure of the gas; and
   (f) means for indicating said variation in response to the pressurized gas to thereby give a measure of the pressure of the gas, said indicating means including,
   (i) an annular band adapted to move axially in response to the variations of the volume of said airtight enclosure;
   (ii) a transparent housing comprising that portion of said first enclosure wherein said annular band moves;
   (iii) at least one grouping of numerals, each grouping extending axially along the length of said transparent housing and corresponding to the range of pressures to be measured by said gauge, each grouping positioned radially about the perimeter of said transparent housing a predetermined distance from another grouping;

(c) means for forming a second enclosure of variable volume within said first enclosure;

(d) means for affixing said gauge to the inflatable device;

(e) first channel means for directing gas released from within the inflatable device via said valve stem axially away from said inflatable device;

(f) second channel means, communicating with said first channel means, for directing the released gas radially outward from said first channel means and into said second enclosure;

said second enclosure increasing in volume in an axial direction toward the inflatable device for increasing gas pressure;

(g) means for controlling the variation of the volume of said second enclosure such that said variation is proportional to the pressure of the gas; and (h) means for indicating said variation in response to the pressurized gas to thereby give a measure of the pressure of the gas.

14. The gauge of claim 13 wherein said indicating means includes:

(a) an annular band adapted to move axially in response to the variations of the volume of said airtight enclosure;

(b) a transparent housing comprising that portion of said first enclosure wherein said annular band moves; and (c) at least one grouping of numerals, each grouping extending axially along the length of said transparent housing and corresponding to the range of pressures to be measured by said gauge, each grouping positioned radially about the perimeter of said transparent housing a predetermined distance from another grouping.

15. The gauge of claim 13 wherein the means for forming said second enclosure comprise an O-ring bonded to a piston-like member which moves within said first enclosure in response to the pressure of the gas.

16. The gauge of claim 13 wherein said indicating means is a piston-like member which moves within said first enclosure along the gauge in an axial direction in response to the pressurized gas and wherein said second enclosure is formed by the interposition of "O-ring" means between the side walls of said piston and the corresponding inside walls of said first enclosure.

17. The gauge of claim 13 wherein said means for forming said second enclosure comprise a piston member, having a cup-shaped cross-section, opening outward in the direction of the gas entering said second enclosure and including feathered edges biased against the walls forming said first enclosure to thereby form said second enclosure.

18. The gauge of claim 15 wherein said first enclosure tapers from a smaller to a larger opening in the direction of increasing volume for said second enclosure, whereby the frictional forces opposing movement of said "O-ring" in response to increased pressure are minimized.

19. The gauge of claim 16 wherein said first enclosure tapers from a smaller to a larger opening in the direction of increasing volume for said second enclosure, whereby the frictional forces opposing movement of said "O-ring" means in response to increased pressure are minimized.

20. The gauge of claim 13 wherein said valve stem is a part of said inflatable device said means for affixing said gauge to the inflatable device including means for affixing said gauge to the valve stem.

21. The gauge of claim 13 wherein the means for forming said second enclosure of variable volume includes a V-shaped seal operatively connected to said indicating means, said seal having the opened portion of said V-shape directed in an axial direction away from said inflatable device, said seal coacting with said indicating means in response to the released gas entering said second enclosure to cause said second enclosure to increase in volume for increasing gas pressure.

22. The gauge of claim 13 wherein said means for affixing said gauge to the inflatable device include:

(a) an elongated mounting stem, said mounting stem including a cavity connecting said inflatable device to said valve stem for directing gas to and from said inflatable device from said gauge;

(b) a plurality of spacer means positioned on said mounting means for spacing said first enclosure a desired distance from said inflatable device; and (c) locking means for securing said stem to said inflatable device.

23. The gauge of claim 13 further comprising means for coacting with said valve stem to release the pressurized gas within the inflatable device, said coacting means also adapted to respond to device inflating means to thereby cause the device to be inflated, said means for coacting including:

(a) a cap portion for cooperating with an operator's finger on said device inflating means;

(b) an extension shaft including first and second geometrically shaped and axially extending sections connected to said cap portion, said shaft further including a valve stem coupling section, said coupling section secured to said valve stem whereby said valve stem is axially removable from said gauge in unison with said shaft;

(c) a coupling collar including, (i) a first cavity, said first cavity geometrically shaped to conform to the outline of said second extending section of said shaft, (ii) a second cavity, said second cavity geometrically shaped to conform to a correspondingly shaped section of said valve stem; whereby rotational motion applied to said cap portion is transmitted through said shaft to said coupling collar and in turn to said valve stem such that said valve stem can be removed from or inserted into said gauge; and (d) a sealing valve arrangement concentrically disposed about said first section of said shaft, said valve arrangement providing the necessary resistance to gas released from said inflating device to prevent said released gas from escaping from said gauge, said valve arrangement further adapted to respond to device inflating means so as to enable pressurized gas to enter said inflatable device around said sealing valve arrangement and through said gauge.

24. The gauge of claim 23 wherein said cap portion includes flattened surfaces for coacting with valve stem removal and insertion tools.

25. The gauge of claim 23 wherein said shaft includes a bleeder hole arrangement, said bleeder hole arrangement communicating between the environment outside the gauge and said first channel, whereby released gas is vented from said gauge after the taking of a pressure reading.

(iv) at least one grouping of serrations, each of said latter groupings extending axially along the length of said transparent housing; and
(v) an indicator ring, adaptable to move axially along the length of said transparent housing and adapted to cooperate with said serrations to thereby be restrained against unintended axial movement.

2. The gauge of claim 1 further comprising mounting means secured to said first enclosure forming means, said mounting means adapted to be secured permanently to the inflatable device.

3. The gauge of claim 1 wherein said airtight enclosure is in the form of a hollow flexible tube.

4. The gauge of claim 1 wherein said airtight enclosure is in the form of a bellows.

5. The gauge of claim 1 wherein said airtight enclosure is formed by a flexible diaphragm.

6. The gauge of claim 1 wherein said indicating means is a piston like member which moves within said first enclosure along the gauge in an axial direction in response to the pressurized gas and wherein said airtight enclosure is formed by the interposition of "O-ring" means between the side walls of said piston and the corresponding inside walls of said first enclosure.

7. The gauge of claim 1 which includes means for mounting said gauge to a valve stem, where the valve stem includes actuating rod means for introducing pressurized gas into the inflatable device, and where said first enclosure includes a cylindrical channel centrally disposed and running the axial length of said gauge, wherein said means for releasing the pressurized gas is a shaft like member extending the axial length of said gauge in said channel, said shaft like member terminating at one end with means for contacting said actuating rod when said gauge is mounted to the valve stem such that said actuating rod is depressed a sufficient amount ot thereby release the pressurized gas into said airtight enclosure.

8. The gauge of claim 7 wherein said contacting means includes a gasket positioned between said contacting means and said channel for sealing off said channel and thereby preventing escape of the pressurized gas through said channel.

9. The gauge of claim 8 where the other end of said shaft includes a bushing positioned thereon, said bushing cooperating with said device inflating means to cause movement of said shaft such that the seal formed by said gasket is broken and thus enabling the device to be inflated.

10. A gauge for measuring the pressure of an inflatable device having a valve stem which comprises:
(a) means for forming a first enclosure;
(b) means for forming an airtight enclosure of variable volume within said first enclosure said airtight enclosure formed by a flexible diaphragm;
(c) means for affixing said gauge to the valve stem;
(d) means for coacting with the valve stem to release the pressurized gas within said inflatable device into said airtight enclosure, said releasing means also adapted to respond to device inflating means to thereby cause the device to be inflated;
(e) means for controlling the variation of the volume of said airtight enclosure, including,
(i) a piston like member, including a plurality of annular ridges, said ridges cooperating with corresponding number of annular rings which form a part of said diaphragm to provide a seal of said airtight enclosure when said diaphragm ruptures, and having a surface to which said diaphragm conforms, which is positioned to move axially within said first enclosure in response to the force exerted by the pressurized gas acting through said diaphragm; and
(ii) a coil spring member having a predetermined spring constant said coil spring member cooperating with said piston like member to control the axial movement of said piston in proportion to the pressure of the pressurized gas, such that said variation is proportional to the pressure of the gas; and
(f) means for indicating said variation in response to the pressurized gas to thereby give a measure of the pressure of the gas.

11. The gauge of claim 10 wherein said piston like member includes an annular appendage extending axially away from the surface of said piston to which said diaphragm conforms, said appendage cooperating with said diaphragm to reduce frictional forces between said diaphragm and said first enclosure.

12. A gauge for measuring the pressure of an inflatable device which comprises:
(a) means for forming a first enclosure said first enclosure including a cylindrical channel centrally disposed and running the axial length of said guage, said first enclosure means further including mounting means adapted to be secured permanently to the inflatable device;
(b) means for forming an airtight enclosure of variable volume within said first enclosure;
(c) means for directiong the pressurized gas within the inflatable device into said airtight enclosure while said gauge is mounted to the device;
(d) means for sealing off said channel thereby preventing the pressurized gas from escaping through said channel, said sealing off means adapted to enable device inflating means to inflate the device through said channel;
(e) means for controlling the variation of the volume of said airtight enclosure, including,
(i) a piston like member positioned to move axially within said first enclosure in response to the force exerted thereon by the pressurized gas in said airtight enclosure, said piston like member defining a second airtight enclosure substantially equal in volume to the difference between the volumes of said first enclosure and said first airtight enclosure; and
(ii) means for filling said second airtight enclosure with pressurized gas, the pressurized gas in said second airtight enclosure exerting a force on said piston like member to thereby counteract the force exerted by the pressurized gas in said first airtight enclosure, such that said variation is proportional to the pressure of said gas; and
(f) means for indicating said variation in response to the pressurized gas to thereby give a measure of the pressure of the gas.

13. A gauge for measuring the pressure of an inflatable device which comprises:
(a) a valve stem assembly centrally disposed within said gauge;
(b) means for forming a first enclosure said first enclosure concentrically disposed outwardly of said valve stem;

26. The gauge of claim 23 wherein said means for coacting further comprises, a spring member concentrically disposed about said shaft and biased between said coupling collar and said sealing valve arrangement, said spring member exerting a positive force on said sealing valve arrangement so as to insure an airtight seal thereof when said gauge is not in use and further exerting a positive force through said shaft on the seal portion of said valve stem so as to insure an airtight seal thereof.

27. The gauge of claim 26 wherein said sealing valve arrangement includes a butterfly valve disposed about the cylindrical portion of said shaft and interposed between said spring member and said cap portion.

28. The gauge of claim 23 wherein said sealing valve arrangement includes an O-ring shaped valve disposed in a corresponding niche in said cap portion.

29. The gauge of claim 13 wherein said means for indicating includes,
   (i) an annular collar having a concentric groove cut therein,
   (ii) a cylindrically shaped extension arm extending axially from said annular collar towards said inflatable device,
   (iii) seal means disposed upon said collar and responsive to the force exerted by said released gas to drive said indicating means axially towards said inflatable device, and
   (v) an indicating band disposed in said groove, said band aligning with suitable markings on said first enclosure forming means to indicate the pressure of said released gas.

30. The gauge of claim 29 wherein said means for controlling the variation of the volume of said second enclosure is a spring member disposed between said annular collar and said first enclosure forming means, said cylindrically shaped extension arm of said indicating means including a radially extending flange member fixedly connected thereto, said flange member coacting with said first enclosure forming means to prevent said indicating means from substantially tilting due to forces exerted thereon by said spring member forming part of the second enclosure volume control means.

31. The gauge of claim 30 wherein said cylindrically shaped extension arm masks at least part of the coils of said spring member forming part of the second enclosure volume control means.

32. The gauge of claim 29 wherein said groove in said annular collar is cut to a predetermined depth so as to minimize any associated parallax error in reading said gauge.

33. The gauge of claim 13 wherein said means for indicating include at least one band on the outside of said first enclosure forming means.

34. The gauge of claim 33 including a second band on the outside of said first enclosure forming means, said first band representing one pressure and said second band representing a second different pressure.

35. The gauge of claim 13 wherein said means for affixing said gauge to said inflatable device include an elongated mounting stem, said mounting stem bent so as to minimize curb interference problems.

* * * * *

UNITED STATES PATENT AND TRADEMARK OFFICE
CERTIFICATE OF CORRECTION

PATENT NO. : 4,136,560
DATED : January 30, 1979
INVENTOR(S) : Alexander T. Gellos It is certified that error appears in the above-identified patent and that said Letters Patent are hereby corrected as shown below:

In the Abstract: 1st Paragraph, line 1 change "is" to --in--, and in the 4th last line change "exapndable" to --expandable--.

2nd Paragraph, line 1, change "expansable" to --expandable--.

Column 4, line 10: change "shown" to --show--.

Column 10, line 5: "s" in the word "sufficient" should be upper case.

Column 11, line 8: change "Tnat" to --This--.

Column 12, line 4: change "and" to --at--.

Column 16, line 65: insert --between-- after the word "passing".

Column 23, line 54: change "therreto" to --thereto--.

Column 29, line 40: change "wherein" to --where--.

Signed and Sealed this

Eleventh Day of March 1980

[SEAL]

Attest:

SIDNEY A. DIAMOND

Attesting Officer

Commissioner of Patents and Trademarks